US012399890B2

(12) United States Patent
Tran et al.

(10) Patent No.: US 12,399,890 B2
(45) Date of Patent: Aug. 26, 2025

(54) SCENE GRAPH MODIFICATION BASED ON NATURAL LANGUAGE COMMANDS

(71) Applicant: ADOBE INC., San Jose, CA (US)

(72) Inventors: Quan Tran, San Jose, CA (US); Zhe Lin, Bellevue, WA (US); Xuanli He, Clayton (AU); Walter Chang, San Jose, CA (US); Trung Bui, San Jose, CA (US); Franck Dernoncourt, Sunnyvale, CA (US)

(73) Assignee: ADOBE INC., San Jose, CA (US)

( * ) Notice: Subject to any disclaimer, the term of this patent is extended or adjusted under 35 U.S.C. 154(b) by 823 days.

(21) Appl. No.: 17/087,943

(22) Filed: Nov. 3, 2020

(65) Prior Publication Data

US 2022/0138185 A1    May 5, 2022

(51) Int. Cl.
*G06N 3/04*    (2023.01)
*G06F 16/242*    (2019.01)
*G06F 40/56*    (2020.01)
*G06N 3/08*    (2023.01)

(52) U.S. Cl.
CPC ............ *G06F 16/243* (2019.01); *G06F 40/56* (2020.01); *G06N 3/04* (2013.01); *G06N 3/08* (2013.01)

(58) Field of Classification Search
None
See application file for complete search history.

(56) References Cited

U.S. PATENT DOCUMENTS

| 11,720,346 B2 * | 8/2023 | Wu ........................... G06F 8/70 |
| | | 707/741 |
| 2020/0133952 A1 * | 4/2020 | Sheinin .................. G06N 3/045 |
| 2020/0272915 A1 * | 8/2020 | Tata ........................ G06F 16/35 |
| 2021/0294781 A1 * | 9/2021 | Fernández Musoles .................... |
| | | G10L 15/197 |

(Continued)

FOREIGN PATENT DOCUMENTS

| CN | 109145763 A | 1/2019 |
| CN | 110909673 A | 3/2020 |
| CN | 111062865 A | 4/2020 |

OTHER PUBLICATIONS

"A Novel Graph-based Multi-modal Fusion Encoder for Neural Machine Translation," Yin et al; Yin, arXiv, Jul. 17, 2020 (Year: 2020).*

(Continued)

*Primary Examiner* — Michael J Huntley
*Assistant Examiner* — Paul J Breene
(74) *Attorney, Agent, or Firm* — F. CHAU & ASSOCIATES, LLC

(57) ABSTRACT

Systems and methods for natural language processing are described. Embodiments are configured to receive a structured representation of a search query, wherein the structured representation comprises a plurality of nodes and at least one edge connecting two of the nodes, receive a modification expression for the search query, wherein the modification expression comprises a natural language expression, generate a modified structured representation based on the structured representation and the modification expression using a neural network configured to combine structured representation features and natural language expression features, and perform a search based on the modified structured representation.

18 Claims, 15 Drawing Sheets

(56) References Cited

U.S. PATENT DOCUMENTS

2022/0108188 A1* 4/2022 Wu .................... G06N 5/04

OTHER PUBLICATIONS

"Variational Lossy Autoencoder," Chen et al; Chen, arXiv, Mar. 4, 2017 (Year: 2017).*
"Auto-Encoding Scene Graphs for Image Captioning," Yang, arXiv, Dec. 11, 2018 (Year: 2018).*
"Iterative Visual Reasoning Beyond Convolutions," Chen, arXiv, Mar. 29, 2018 (Year: 2018).*
10.8 Beam Search—Dive Into Deep Learning (Year: 2020).*
"Text GNN—Improving Text Encoder via Graph Neural Network in Sponsored Search," WWW '21, Apr. 19-23, 2021 (Year: 2021).*
"Iterative GNN-based Decoder for Question Generation," Fei et al; Fei (Year: 2021).*
"Autoencoder," Wikipedia (Year: 2019).*
"Attention (machine learning)," Wikipedia (Year: 2024).*
"Adjacency Matrix of Directed Graphs," GeeksforGeeks (Year: 2024).*
"Generating Long Sequences with Sparse Transformers," arXiv, Child et al; Child (Year: 2019).*
"Generating Semantically Precise Scene Graphs from Textual Descriptions for Improved Image Retrieval," Stanford University, Schuster et al; Schuster (Year: 2018).*
What Is a Transformer Model? Nvidia (Year: 2024).*
"Text Generation from Knowledge Graphs with Graph Transformers," Proceedings of NAACL-HLT, pp. 2284-2293, Koncel-Kedziorski et al; Koncel-Kedziorski. (Year: 2019).*
"Scene Graph Generation by Iterative Message Passing," Proceedings of the IEEE Conference on Computer Vision and Pattern Recognition (CVPR), pp. 5410-5419, Xu et al; Xu, (Year: 2017).*
"Stacked squeeze-and-excitation recurrent residual network for visual-semantic matching," Pattern Recognition, vol. 105, Wang et al; Wang. (Year: 2020).*
Peter Anderson, et al, "SPICE: Semantic Propositional Image Caption Evaluation", In European Conference on Computer Vision, 2016, pp. 382-398. Springer.
Dzmitry Bahdanau, et al, "Neural Machine Translation by Jointly Learning to Align and Translate", arXiv preprint arXiv:1409.0473, 2014, 15 pages.
Joost Bastings, et al, "Graph Convolutional Encoders for Syntax-aware Neural Machine Translation", In Proceedings of the 2017 Conference on Empirical Methods in Natural Language Processing, pp. 1957-1967, 2017, Copenhagen, Denmark, Association for Computational Linguistics.
Daniel Beck, et al., "Graph-to-Sequence Learning using Gated Graph Neural Networks", arXiv preprint arXiv:1806.09835, 2018, 13 pages.
Jan Buys, et al., "Robust Incremental Neural Semantic Graph Parsing", In Proceedings of the 55th Annual Meeting of the Association for Computational Linguistics, 2017, pp. 1215-1226.
Deng Cai, et al., "Graph Transformer for Graph-to-Sequence Learning", arXiv preprint arXiv:1911.07470, 2019, 9 pages.
Danqi Chen, et al, "A Fast and Accurate Dependency Parser using Neural Networks", In Proceedings of the 2014 Conference on Empirical Methods in Natural Language Processing (EMNLP), 2014, pp. 740-750.
Rewon Child, et al., "Generating Long Sequences with Sparse Transformers". arXiv preprint arXiv:1904.10509, 2019, 10 pages.
Kyunghyun Cho, et al., "Learning Phrase Representations using RNN Encoder-Decoder for Statistical Machine Translation", arXiv preprint arXiv:1406.1078, 2014, 15 pages.
Kevin Clark, et al., "Semi-Supervised Sequence Modeling with Cross-View Training", arXiv preprint arXiv:1809.08370, 2018, 17 pages.
Li Dong, et al., "Coarse-to-Fine Decoding for Neural Semantic Parsing", In Proceedings of the 56th Annual Meeting of the Association for Computational Linguistics, 2018, pp. 731-742.
Timothy Dozat, et al., "Deep Biaffine Attention for Neural Dependency Parsing", arXiv preprint arXiv:1611.01734, 2016, 8 pages.
Sergey Edunov, et al., "Understanding Back-Translation at Scale", arXiv preprint arXiv:1808.09381, 2018, 12 pages.
Matt Gardner, et al., "AllenNLP: A Deep Semantic Natural Language Processing Platform", 2017, 6 pages.
Zhijiang Guo, et., "Densely Connected Graph Convolutional Networks for Graph-to-Sequence Learning", Transactions of the Association for Computational Linguis- tics, vol. 7, 2019, pp. 297-312.
Xuanli He, et al, "A Pointer Network Architecture for Context-Dependent Semantic Parsing", In Proceedings of the 17th Annual Workshop of the Australasian Language Technology Association, 2019, pp. 94-99.
Srinivasan Iyer, et al., "Learning a Neural Semantic Parser from User Feedback", In Proceedings of the 55th Annual Meeting of the Association for Computational Linguistics, 2017, pp. 963-973.
Mohit Iyyer, et al., "Search-based Neural Structured Learning for Sequential Question Answering", In Proceedings of the 55th Annual Meeting of the Association for Computational Linguistics (vol. 1: Long Papers), 2017, pp. 1821-1831.
Sébastien Jean, et al, "Montreal Neural Machine Translation Systems for WMT'15", In Proceedings of the Tenth Workshop on Statistical Machine Translation, 2015, pp. 134-140.
Justin Johnson, et al., "Image Retrieval using Scene Graphs", In Proceedings of the IEEE conference on computer vision and pattern recognition, 2015, pp. 3668-3678.
Thomas N. Kipf, et al., "Semi-Supervised Classification with Graph Convolutional Networks", CoRR, abs/1609.02907, 2016, 14 pages.
Ranjay Krishna, et al., "Visual Genome: Connecting Language and Vision Using Crowdsourced Dense Image Annotations", International Journal of Computer Vision, 123(1):32-73, 2017.
Yujia Li, et al., "Learning Deep Generative Models of Graphs", Proceedings of the 35th International Conference on Machine Learning, Stockholm, Sweden, PMLR 80, 2018, 21 pages.
Tsung-Yi Lin, et al. "Microsoft COCO: Common Objects in Context", In European Conference on Computer Vision, 2014, pp. 740-755. Springer.
Minh-Thang Luong, et al., "Effective Approaches to Attention-Based Neural Machine Translation", arXiv preprint arXiv:1508.04025, 2015, 11 pages.
Ramesh Manuvinakurike, et al., "Edit me: A Corpus and a Framework for Understanding Natural Language Image Editing", In Proceedings of the Eleventh International Conference on Language Resources and Evaluation (LREC 2018), 2018, 5 pages.
Julien Perez, et al. "Dialog state tracking, a machine reading approach using Memory Network", arXiv preprint arXiv:1606.04052, 2016, 10 pages.
Liliang Ren, et al., "Towards Universal Dialogue State Tracking", arXiv preprint arXiv:1810.09587, 2018, 7 pages.
Sebastian Schuster, et al., "Generating Semantically Precise Scene Graphs from Textual Descriptions for Improved Image Retrieval", In Proceedings of the 2015 Workshop on Vision and Language, 2016, pp. 70-80.
Piyush Sharma, et al., "Conceptual Captions: A Cleaned, Hypernymed, Image Alt-Text Dataset for Automatic Image Captioning", In Proceedings of the 56th Annual Meeting of the Association for Computational Linguistics (vol. 1: Long Papers), pp. 2556-2565, 2018, Melbourne, Australia. Association for Computational Linguistics.
Martin Simonovsky, et al., "GraphVAE: Towards Generation of Small Graphs Using Variational Autoencoders", In International Conference on Artificial Neural Networks, pp. 412-422, 2018, Springer.
Linfeng Song, et al., "A Graph-to-Sequence Model for AMR-to-Text Generation", arXiv preprint arXiv:1805.02473, 2018, 11 pages.
Shashank Srivastava, et al., "Parsing Natural Language Conversations using Contextual Cues", IJCAI, 2017, pp. 4089-4095.
Alane Suhr, et al., "Learning to Map Context-Dependent Sentences to Executable Formal Queries", arXiv preprint arXiv:1804.06868, 2018, 21 pages.
Ashish Vaswani, et al., "Attention Is All You Need", In Advances in neural information processing systems, 2017, pp. 5998-6008.
Ivan Vendrov, et al., "Order-Embeddings of Images and Language", arXiv preprint arXiv:1511.06361, 2015, 12 pages.

(56) References Cited

OTHER PUBLICATIONS

Yu-Siang Wang, et al., "Scene Graph Parsing as Dependency Parsing", arXiv preprint arXiv:1803.09189, 2018, 11 pages.
Zonghan Wu, et al., "A Comprehensive Survey on Graph Neural Networks", IEEE Transactions on Neural Networks and Learning Systems, 2020, 22 pages.
Xu Yang, et al., "Auto-Encoding Scene Graphs for Image Captioning", In Proceedings of the IEEE Conference on Computer Vision and Pattern Recognition, 2019, pp. 10685-10694.
Jiaxuan You, et al., GraphRNN: Generating Realistic Graphs with Deep Auto-regressive Models, arXiv preprint arXiv:1802.08773, 2018, 12 pages.
Junru Zhou, et al., "Head-Driven Phrase Structure Grammar Parsing on Penn Treebank", arXiv preprint arXiv:1907.02684, 2019, 13 pages.
OpenAI, et al., "Solving Rubik's Cube With A Robot Hand", 2019.
Khalil Mrini, et al., "Rethinking Self-attention: An Interpretable Self-attentive Encoder-Decoder Parser", arXiv preprint arXiv:1911.03875, 2019, 8 pages.
Office Action issued by the CNIPA on Apr. 9, 2025 in related Chinese Patent Application No. 202110955848.X, 14 pages, in Chinese.

\* cited by examiner

SCENE GRAPH MODIFICATION BASED ON NATURAL LANGUAGE COMMANDS

BACKGROUND

The following relates generally to natural language processing, and more specifically to natural language processing using a conditional graph modification technique.

Natural language processing (NLP) refers to techniques for using computers to interpret natural language. In some cases, NLP tasks involve assigning annotation data such as grammatical information to words or phrases within a natural language expression. Different classes of machine-learning algorithms have been applied to NLP tasks. These algorithms may take a set of features generated from the natural language data as input. Some algorithms, such as decision trees, utilize hard if-then rules. Other systems use neural networks or statistical models which make soft, probabilistic decisions based on attaching real-valued weights to input features. These models can express the relative probability of multiple answers.

Structured representations like graphs and parse trees play an important role in many NLP tasks. Therefore, a number of NLP devices include parsers that map text to graphs or parse trees. However, conventional NLP devices are unable to modify an existing structured representation based on a natural language modification command. Therefore, there is a need in the art for systems and methods for changing structured representations.

SUMMARY

The present disclosure provides systems and methods for generating structured representations for modified natural language expressions. In some embodiments, a structured representation representing an original expression is encoded using a first neural network, and a modification expression representing a change to the original expression is encoded using a second neural network. The encoded structural representation and the encoded modification expression are combined in an embedding space, and the combined result is used to generate an output structure representation representing a modified expression.

A method, apparatus, and non-transitory computer readable medium for natural language processing are described. Embodiments of the method, apparatus, and non-transitory computer readable medium are configured to receive a structured representation of a search query, wherein the structured representation comprises a plurality of nodes and at least one edge connecting two of the nodes, receive a modification expression for the search query, wherein the modification expression comprises a natural language expression, generate a modified structured representation based on the structured representation and the modification expression using a neural network configured to combine structured representation features and natural language expression features, and perform a search based on the modified structured representation.

An apparatus and method for natural language processing are described. Embodiments of the apparatus and method include a graph encoder configured to generate structured representation features based on a structured representation, a text encoder configured to generate natural language expression features based on a modification expression, a feature fusion network configured to produce combined features based on the structured representation features and the natural language expression features, a node decoder configured to generate a set of nodes based on the combined features, and an edge decoder configured to generate a set of edges based on the combined features and the set of nodes.

A method, apparatus, and non-transitory computer readable medium for training a neural network for natural language processing are described. Embodiments of the method, apparatus, and non-transitory computer readable medium are configured to identify training data including a plurality of annotated training examples, wherein each of the annotated training examples comprises a source structured representation, a target structured representation, and at least one modification expression, generate structured representation features for the source structured representation using a graph encoder, generate natural language expression features for the at least one modification expression using a text encoder, combine the structured representation features and the natural language expression features using a feature fusion network to produce combined features, generate a set of nodes based on the combined features using a node decoder, generate a set of edges based on the combined features and the set of nodes using an edge decoder, compare the set of nodes and the set of edges to the target structured representation, and update the neural network based on the comparison.

DETAILED DESCRIPTION

The present disclosure relates to systems and methods for performing natural language processing (NLP). Some embodiments of the present disclosure relate to conditional graph modification, in which a source graph representing a natural language expression is modified based on a modification command. In some examples, a neural network is trained to perform the modification.

Structured representations like graphs and parse trees play an important role in many NLP tasks. Therefore, some NLP devices include parsers that map text to graphs or parse trees. However, conventional NLP devices are unable to apply manipulations to the structured representations. In some cases, text is parsed to produce a structured representation during an interaction between a human and a computer. However, a typical human-computer interaction session or conversation is not single-turn (e.g., image search). Therefore, parsing a single sentence may not be sufficient.

If a conventional NLP device is used during conversation with a human user, it will be unable to update a previously generated graph based on a subsequent turn in the conversation. For example, a user performing a search may start with a short phrase describing the main objects or topics they are looking for in a search. Depending on the result, the user may modify their query to add more constraints or give additional information. In this case, a static representation is not suitable to track the updated intent of the user. Therefore, conventional NLP devices are unable to engage in seamless multi-turn engagements where the user changes the intent of previous statements.

Therefore, the present disclosure provides methods and systems to perform graph modification. Unlike conventional NLP devices, an NLP device of the present disclosure includes the unconventional element of a neural network model that is trained to update an existing scene graph given a new user's command. Accordingly, an improved NLP device according to the present disclosure is capable of updating existing graphs based on a user's subsequent statements. As a result, the improved NLP device can engage in seamless multi-turn engagements with a human user where the user changes the intent of previous statements.

In some embodiments, a structured representation representing an original expression is encoded using a first neural network, and a modification expression representing a change to the original expression is encoded using a second neural network. The encoded structural representation and the encoded modification expression are combined in an embedding space, and the combined result is used to generate an output structure representation representing a modified expression. In some examples, the model is based on a graph-based sparse transformer and cross attention information fusion. According to an embodiment, large graph modification datasets are created and used for training of the models.

Figure 1:
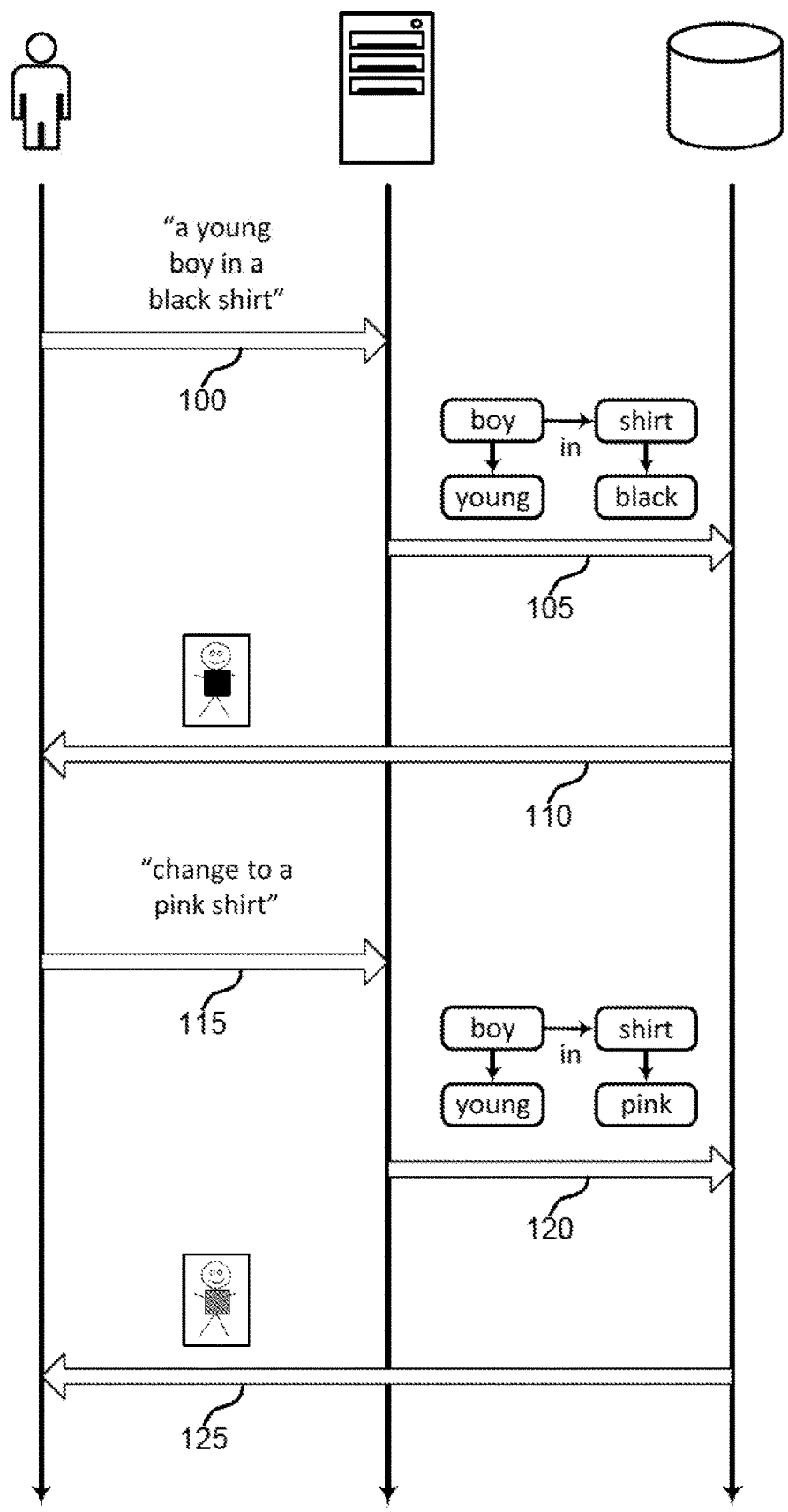
FIG. 1 shows an example of a process for providing search results according to aspects of the present disclosure.

FIG. 1 shows an example of a process for providing search results according to aspects of the present disclosure. The process of FIG. 1 is an example of how a system for modifying a structured representation can be applied to a system for searching for images based on a natural language search query. However, this is not a limiting example, and the systems and methods of the present disclosure may also be applied to other applications.

In some examples, the operations of FIG. 1 are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 100, a user provides a search query. The user interacts with a computer (or any electronic device capable of human-device interaction) in a human-computer interaction session or conversation. The conversation can be more than a single-turn exchange. In some cases, the user begins with short phrases describing the primary objects or topics she is looking for (e.g., the search phrase or search query is "a young boy in a black shirt"). Depending on the generated result, the user may modify her search query to add more constraints or provide additional information to refine the search. In some cases, the operations of this step refer to, or may be performed by, a user as described with reference to FIG. 2.

At operation 105, the server generates a structure representation (e.g., a graph) representing the search query. A structured representation may refer to a formalized representation of a language expression. Structured representations, like natural language expressions, may also represent images. Representing a natural language expression as a structured representation can improve image search results because the structured representation clearly identifies objects and relationships to be included in the search. In some cases, the operations of this step refer to, or may be performed by, a server as described with reference to FIG. 2.

In some cases, the server may use a neural network model to encode the structured representation (i.e., with a graph encoder) and the modification query (i.e., with a text encoder) into an embedding space. The output of the encoders may be referred to as structured representation features and natural language expression features, respectively. In some cases, the structured representation features and natural language expression features are represented as vectors in a common embedding space.

In some cases, a structured representation may include two or more nodes representing objects or concepts, and edges representing relationships between the nodes. In one example, "black" and "shirt" are nodes connected by the "attribute" relationship. In another example, "man" and "hat" are nodes and "wearing" describes the relationship.

According to an embodiment of the present disclosure, a graph may be generated by a graph generator. In the case of a graph representing an image, the graph is referred to as a scene graph (i.e., semantic representations of an image). The graph includes nodes and edges, where each of the edges connects two respective nodes. The nodes represent objects while the edges represent an attribute or relationship between respective nodes. For example, a user's initial search query may be "a young boy in a black shirt". A parser is used to parse a search query into a list of objects, e.g., "boy" and "shirt". In some examples, the objects and their associated attributes and relationships form a group of triplets, e.g., (boy, in, shirt), (boy, attribute, young) and (shirt, attribute, black).

At operation 110, a database provides search results based on the graph (e.g., one or more images corresponding to the search query). In some examples, the database provides the user with the search results to enable the user to find content of make a decision. In some cases, the user can modify the search based on the search results (i.e., take the search results as they are or modify the search query to reach some other results). In some cases, the operations of this step refer to, or may be performed by, a database as described with reference to FIG. 2.

At operation 115, the user provides a modification to the search query. In some cases, depending on the generated results from the database, the user may choose to modify her search query to add more constraints or provide additional information to refine the search. In the example above, the user no longer desires a black shirt. Instead, the user provides the modification query "change to a pink shirt".

As in this example, the modification query does not need to include a complete expression, or refer to each node or edge in the original search query (or the original graph). Thus, in some cases, a system determines which nodes and edges are being changed, and what they are being changed to. In this case, the search query is modified to "a young boy in a pink shirt", where the attribute (describing the color) associated with shirt is changed. In various cases, the server adds, changes, or removes nodes or edges of a graph based on the modification query. In some cases, the operations of this step refer to, or may be performed by, a user as described with reference to FIG. 2.

At operation 120, the server modifies the graph based on the modification. Objects, attributes, and relation between two objects are modified, and hence an updated structure representation (i.e., a scene graph) is generated based on the modification. For example, when the user's modification query is "change to a pink shirt," the shirt is no longer black, but pink. The updated objects and their updated associated attributes and relationships form a group of triplets, e.g., (boy, in, shirt), (boy, attribute, young) and (shirt, attribute, pink).

In another example, the user no longer desires a shirt regardless of the color and modifies the search query to be "a young boy". The nodes representing the shirt and black, respectively, are deleted. The server modifies the graph by removing the nodes and edges associated with those nodes. In some cases, the operations of this step refer to, or may be performed by, a server as described with reference to FIG. 2.

At operation 125, the database provides updated search results based on the modified graph. For example, the database provides the user with the updated search results, so that the user makes a decision based on the search results (i.e., take the updated search results as they are or continue modifying the updated search query). In some cases, the operations of this step refer to, or may be performed by, a database as described with reference to FIG. 2. In some cases, multiple iterations between the user, the server, and the database are performed before the user is satisfied with the search results.

Figure 2:
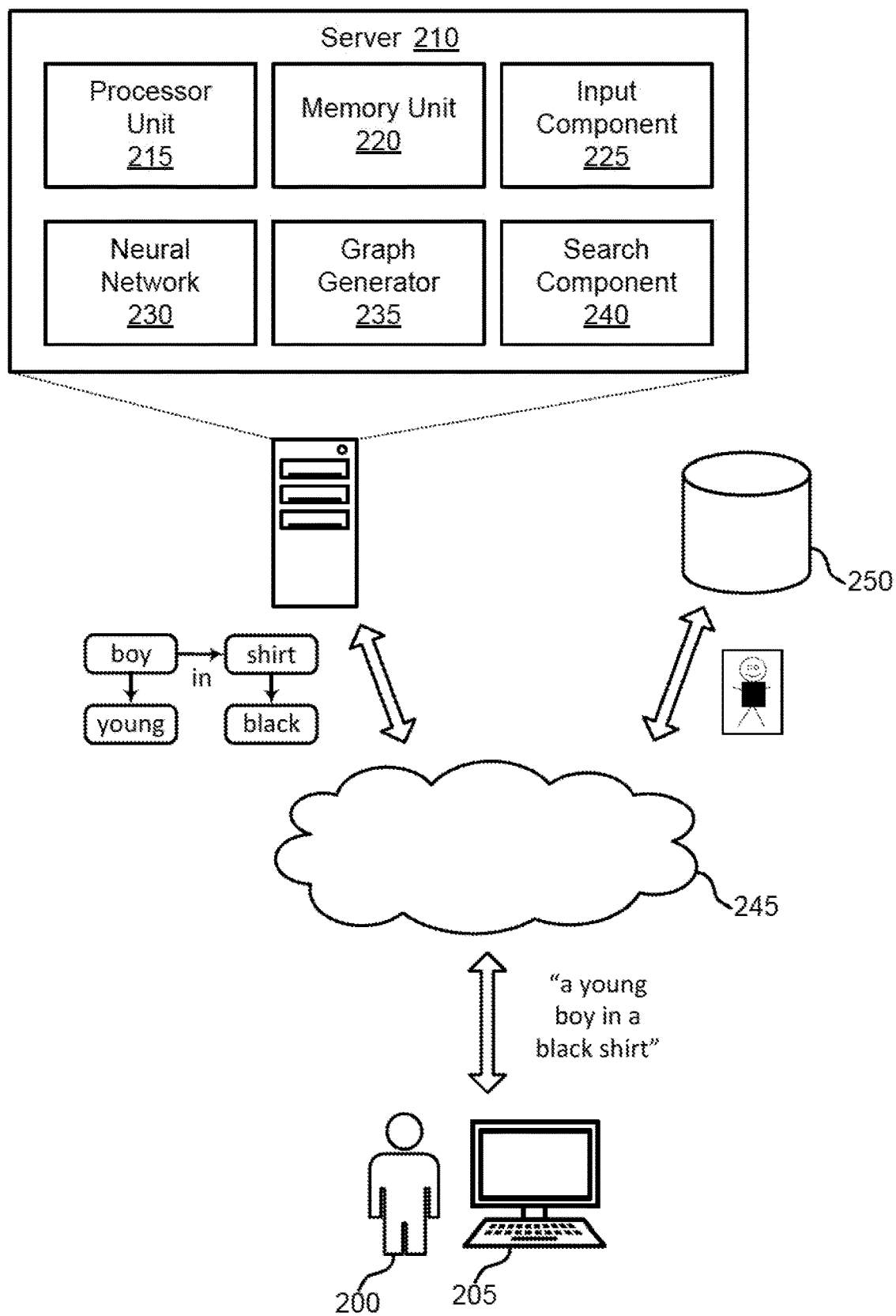
FIG. 2 shows an example of a system for natural language processing according to aspects of the present disclosure.

FIG. 2 shows an example of a system for natural language processing according to aspects of the present disclosure. The example shown includes user 200, user device 205, server 210, cloud 245, and database 250. In one embodiment, server 210 includes processor unit 215, memory unit 220, input component 225, neural network 230, graph generator 235, and search component 240. However, in some embodiments, the components and functions of the server are located on the user device 205.

The user 200 may communicate with the server 210 via the user device 205 and the cloud 245. For example, the user 200 provides a search query and the server 210 generates a graph representing the search query. The search results based on the graph are stored in the database 250. The user 200 provides a modification to the search query and the server modifies the graph based on the modification. The updated search results are added to the database 250.

The user device 205 may be a personal computer, laptop computer, mainframe computer, palmtop computer, personal assistant, mobile device, or any other suitable processing apparatus.

Cloud 245 is a computer network configured to provide on-demand availability of computer system resources, such as data storage and computing power. In some examples, the cloud 245 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 245 is limited to a single organization. In other examples, the cloud 245 is available to many organizations. In one example, cloud 245 includes a multi-layer communications network comprising multiple edge routers and core routers. In another example, cloud 245 is based on a local collection of switches in a single physical location.

Server 210 provides one or more functions to users linked by way of one or more of the various networks. In some cases, the server 210 includes a single microprocessor board, which includes a microprocessor responsible for controlling aspects of the server. In some cases, a server 210 uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP). In some cases, a server 210 is configured to send and receive hypertext markup language (HTML) formatted files (e.g., for displaying web pages). In various embodiments, a server 210 comprises a general purpose computing device, a personal computer, a laptop computer, a mainframe computer, a super computer, or any other suitable processing apparatus.

A processor unit 215 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 215 is configured to operate a memory array using a memory controller. In other cases, a memory controller is integrated into the processor unit 215. In some cases, the processor unit 215 is configured to execute computer-readable instructions stored in a memory to perform various functions. In some embodiments, a processor unit 215 includes special purpose components for modem processing, baseband processing, digital signal processing, or transmission processing.

Examples of a memory unit 220 include random access memory (RAM), read-only memory (ROM), or a hard disk. Examples of memory devices include solid state memory and a hard disk drive. In some examples, memory unit 220 is used to store computer-readable, computer-executable software including instructions that, when executed, cause a processor to perform various functions described herein. In some cases, the memory unit 220 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory unit 220 store information in the form of a logical state.

In some embodiments, the server 210 includes an artificial neural network (ANN). An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

In some embodiments, the server 210 includes a recurrent neural network (RNN). An RNN is a class of ANN in which connections between nodes form a directed graph along an ordered (i.e., a temporal) sequence. This enables an RNN to model temporally dynamic behavior such as predicting what element should come next in a sequence. Thus, an RNN is suitable for tasks that involve ordered sequences such as text recognition (where words are ordered in a sentence). The term RNN may include finite impulse recurrent networks (characterized by nodes forming a directed acyclic graph), and infinite impulse recurrent networks (characterized by nodes forming a directed cyclic graph).

According to some embodiments, input component 225 receives a structured representation of a search query, where the structured representation includes a set of nodes and at least one edge connecting two of the nodes. The input component 225 receives the search query as a natural language expression. A graph generator (described below) is configured to generate the structured representation based on the natural language expression.

The input component 225 receives a modification expression for the search query, where the modification expression includes a natural language expression. For example, the modification expression is "show me the men with the jackets." The modification expression creates or modifies a relationship between two objects (i.e., men, jackets).

According to one embodiment of present disclosure, input components 225 receives a semantic representation of image (i.e., a scene graph). In some cases, a parser is used to parses a sentence (i.e., a search query) into a list of objects. For example, one search query is "a young boy in a black shirt". The list of objects includes "boy" and "shirt". These objects and their associated attributes and relations form a group of triplets, e.g., (boy, in, shirt), (boy, attribute, young) and (shirt, attribute, black). In some embodiments, leveraging human annotators can increase and analyze data quality.

According to some embodiments, neural network 230 generates a modified structured representation based on the structured representation and the modification expression. In some cases, the neural network 230 combines structured representation features and natural language expression features. Neural network 230 is an example of, or includes aspects of, the corresponding element described with reference to FIG. 3.

In some embodiments, the neural network 230 includes an encoder-decoder architecture that uses a graph-conditioned transformer and cross-attention network. In some cases, the neural network 230 learns how to update an existing scene graph given a new user's commands (i.e., natural language commands). In one embodiment, the neural network 230 is based on a graph-based sparse transformer and cross-attention information fusion.

According to some embodiments, graph generator 235 generates the structured representation. In some examples, graph generator 235 is configured to generate the structured representation based on a natural language expression input. The structured representation includes a set of nodes and at least one edge connecting two of the nodes. The natural language expression is created from a search query entered by a user. For example, graph generator 235 may receive a referring expression as input and generate a parse tree that is mapped into a hierarchical subject, predicate, object (<S, P, O>) graph structure.

In some embodiments, graph generator 235 generates the structured representation using a parsing process that incorporates a "label attention model" in which attention heads of the graph generator network correspond to labels used for different syntactic categories to be assigned. In one embodiment, there is one attention head for each label. Thus, for example, a label attention head that determines whether a word corresponds to a "noun phrase" category pays attention to different parts of an input expression than a label attention head that determines whether the word corresponds to a "verb phrase" category.

In some embodiments, graph generator 235 employs object ontologies to understand image objects (e.g., that a "hiker" is a kind of "person") and to detect and classify object attributes (e.g., that "tan" is a color or "wooden" is a material). To improve the accuracy of the mappings between language objects and vision labels, some embodiments employ a grounding ontology that ensures consistent semantic mapping between language objects and vision labels.

According to some embodiments, search component 240 performs a search based on the modified structured representation. In some examples, the search component 240 retrieves a set of images corresponding to the modified structured representation based on the search. The search component 240 may be configured to perform a search based on a modified structured representation comprising the set of nodes and the set of edges.

Figure 3:
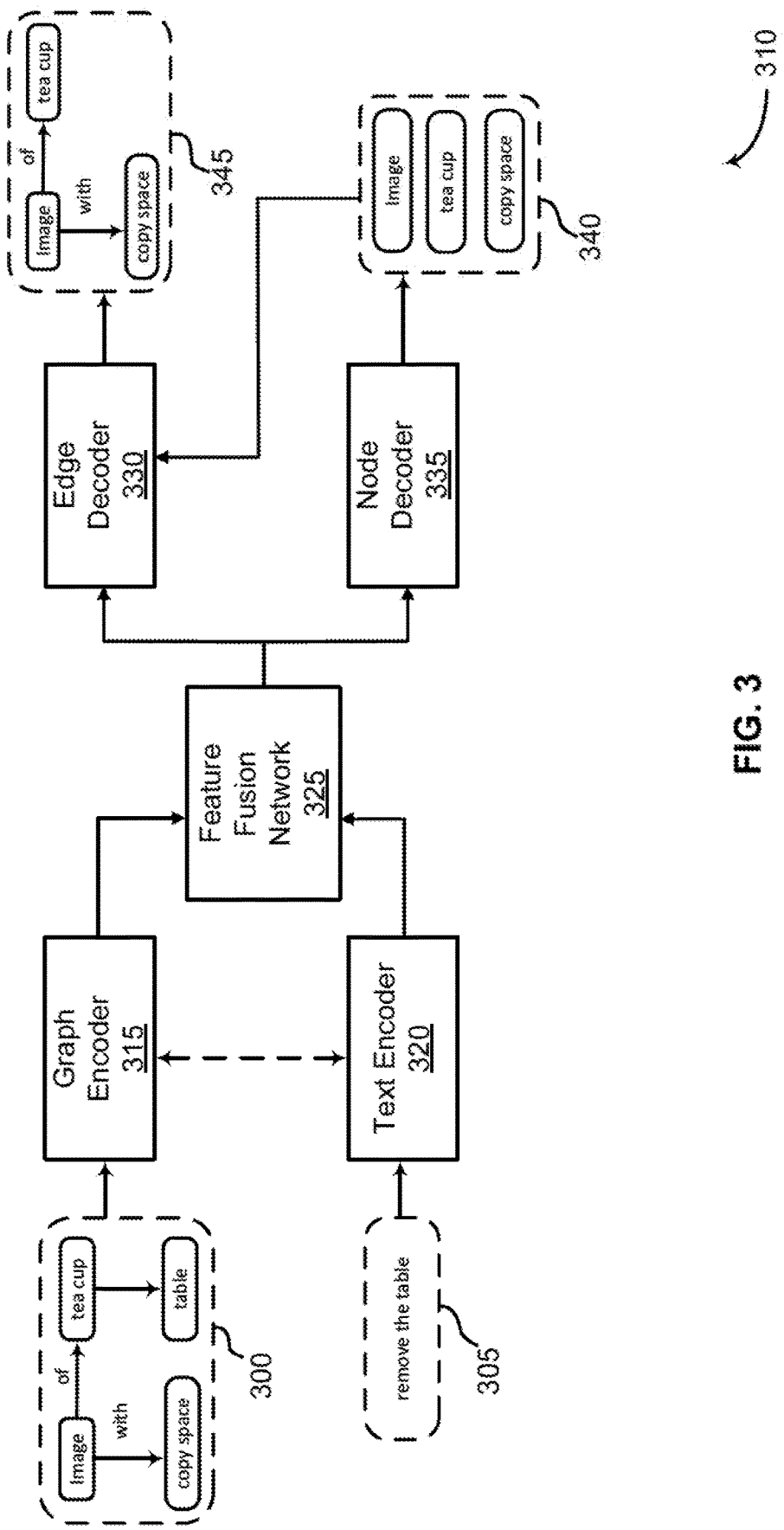
FIG. 3 shows an example of a neural network for natural language processing according to aspects of the present disclosure.

FIG. 3 shows an example of a neural network 310 for natural language processing according to aspects of the present disclosure. The example shown includes source graph 300, modification query 305, neural network 310, node list 340, and target graph 345.

Source graph 300 is an example of, or includes aspects of, the corresponding element described with reference to FIG. 4. In some cases, the source graph 300 is a scene graph (i.e., semantic representations of an image). The source graph 300 is a semantic formalism which represents the desired image as a graph of objects with relations and attributes. In some cases, a parser is used to parse a sentence into a list of objects, and the objects and their associated attributes and relations form a group of triplets. A graph generator is configured to generate the structured representation, where the structured representation includes a set of nodes and at least one edge connecting two of the nodes. For example, the source graph 300 includes four objects (i.e., image, copy space, teacup, and table). The objects and their associated attributes and relations form a group of triplets, in this case, (image, with, copy space), (image, of, teacup), and (teacup, attribute, table).

According to an embodiment of the present disclosure, given a scene graph g, the neural network 310 constructs a triplet (x, y, z), where x is the source graph, y indicates the modification query 305, and z represents the target graph.

Modification query 305 is an example of, or includes aspects of, the corresponding element described with reference to FIG. 4. The modification query 305 represents an expression for the search query entered by a user, where the modification expression includes a natural language expression. The modification query 305 creates or modifies a relationship between two objects. For example, the modification query 305 is "remove the table". In another example, the modification query 305 is "show me the men with the jackets." The modification expression creates or modifies a relationship between two objects (i.e., men, jackets).

In one embodiment of the present disclosure, neural network 310 includes graph encoder 315, text encoder 320, feature fusion network 325, edge decoder 330, and node decoder 335. Neural network 310 is an example of, or includes aspects of, the corresponding element described with reference to FIG. 2. An encoder-decoder architecture is used for conditional graph modification. According to an embodiment of the present disclosure, the graph encoder 315 is built upon a self-attention architecture of machine translation models. In addition, one embodiment provides a graph-conditioned sparse transformer, in which the relation information is embedded directly into the self-attention grid.

According to an embodiment of the present disclosure, the encoder-decoder architecture includes the graph encoder 315 (i.e., graph-conditioned, sparsely connected transformer), early feature fusion model and late feature fusion model for combining information from an input text (e.g., the modification query 305) and a source graph 300.

According to an embodiment of the present disclosure, the task takes a source graph and a modification query as inputs, and the neural network 310 includes two encoders to model source graph and text information (i.e., natural language expression) separately. The source graph and text modification query are encoded into a joint representation, then the neural network 310 generates a target graph during a two-stage operation. The target nodes are generated via a node-level RNN. Then, the neural network 310 leverages another RNN to produce the target edges over the nodes.

For decoders (i.e., the edge decoder 330 and the node decoder 335), the graph modification task is treated as a sequence generation task. Further, to encourage information sharing between an input graph and modification query, techniques such as late feature fusion through gating, and early feature fusion through cross-attention are used.

According to some embodiments, the graph encoder 315 may be configured to generate structured representation features based on a structured representation. In some examples, the graph encoder 315 includes a sparsely connected transformer network. The graph encoder 315 generates structured representation features for the source structured representation. In some cases, graph convolutional networks (GCNs) and graph transformer are used as the graph encoder 315 for graph-to-sequence transduction in semantic-based text generation. Graph encoder 315 is an example of, or includes aspects of, the corresponding element described with reference to FIG. 4.

The transformer architecture depends on a grid of fully-connected self-attention to obtain the contextualized representations from a sequence of elements. According to an embodiment of the present disclosure, a graph-conditioned, sparsely connected transformer is used to encode information from the source graph 300.

According to some embodiments, the text encoder 320 generates the natural language expression features based on the modification expression. In some examples, the text encoder 320 includes a transformer network. For example, the modification expression is "remove the table". Text encoder 320 generates natural language expression features for the at least one modification expression. Text encoder 320 is an example of, or includes aspects of, the corresponding element described with reference to FIG. 4.

According to an embodiment of the present disclosure, a standard transformer encoder is used to encode the modification query 305. In another embodiment, the parameters of the graph encoder 315 and the text encoder 320 are shared with each other to promote semantic alignment.

According to some embodiments, feature fusion network 325 combines the structured representation features and the natural language expression features to produce a set of combined features. In some examples, the feature fusion network 325 includes a stage gating mechanism. In some other examples, the feature fusion network 325 includes a cross-attention network.

According to some embodiments, feature fusion network 325 combines the structured representation features and the natural language expression features to produce combined features. Feature fusion network 325 is an example of, or includes aspects of, the corresponding element described with reference to FIG. 4.

According to some embodiments of the present disclosure, there are two sources of information, which require a separate encoder for each of the two sources. One way is to incorporate two information sources through concatenation to produce a concatenated representation.

To increase the ability of the model to combine the encoders' information for a better use, a parametric approach with gating mechanism is herein applied. Through the gating mechanism, the neural network 310 can filter useful information from the graph based on the modification query 305, and vice versa. To achieve a deeper interaction between the graph encoder and the text encoder, one embodiment of the present disclosure fuses features at the early stage before the contextualized node and token representations are learned. This is achieved via an early fusion technique such as cross-attention.

According to some embodiments, edge decoder 330 generates a set of edges based on the combined features and the set of nodes, where the modified structured representation includes the set of nodes and the set of edges. In some examples, the edge decoder 330 includes an adjacency matrix decoder. In some other examples, the edge decoder 330 includes a flat edge-level decoder. Edge decoder 330 is an example of, or includes aspects of, the corresponding element described with reference to FIGS. 5 and 6.

According to some embodiments, node decoder 335 generates a set of nodes based on the combined features. In some examples, the node decoder 335 includes an RNN. Gated recurrent unit (GRU) cells are used for the RNN node decoder 335. In one example, the node decoder 335 includes a basic auto-regressive model.

According to an embodiment, the node list 340 is generated from the node decoder 335. The node list 340 includes three nodes which are image, teacup, and copy space.

Target graph 345 is an example of, or includes aspects of, the corresponding element described with reference to FIGS. 8-11. The target graph 345 is a scene graph (i.e., semantic representations of an image). The target graph 345 is a semantic formalism which represents the desired image as a graph of objects with relations and attributes. In some cases, a parser is used to parse a sentence into a list of objects, and the objects and their associated attributes and relations form a group of triplets. A graph generator is configured to generate the structured representation, where the structured representation includes a set of nodes and at least one edge connecting two of the nodes. For example, the target graph 345 includes three objects (i.e., image, teacup, and copy space). The objects and their associated attributes and relations form a group of triplets, in this case, (image, with, copy space) and (image, of, teacup). The previous triplet (teacup, attribute table) is removed due to the modification query 305 (i.e., "remove the table").

Figure 4:
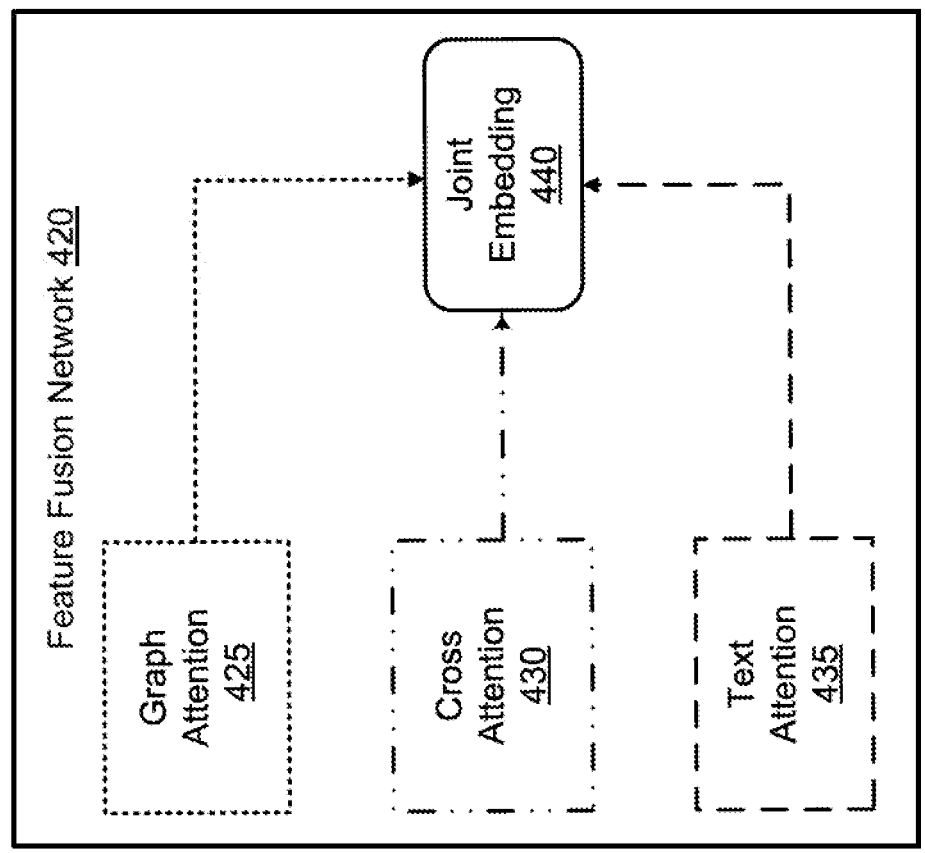
FIG. 4 shows an example of cross-attention fusion according to aspects of the present disclosure.
Figure 4:
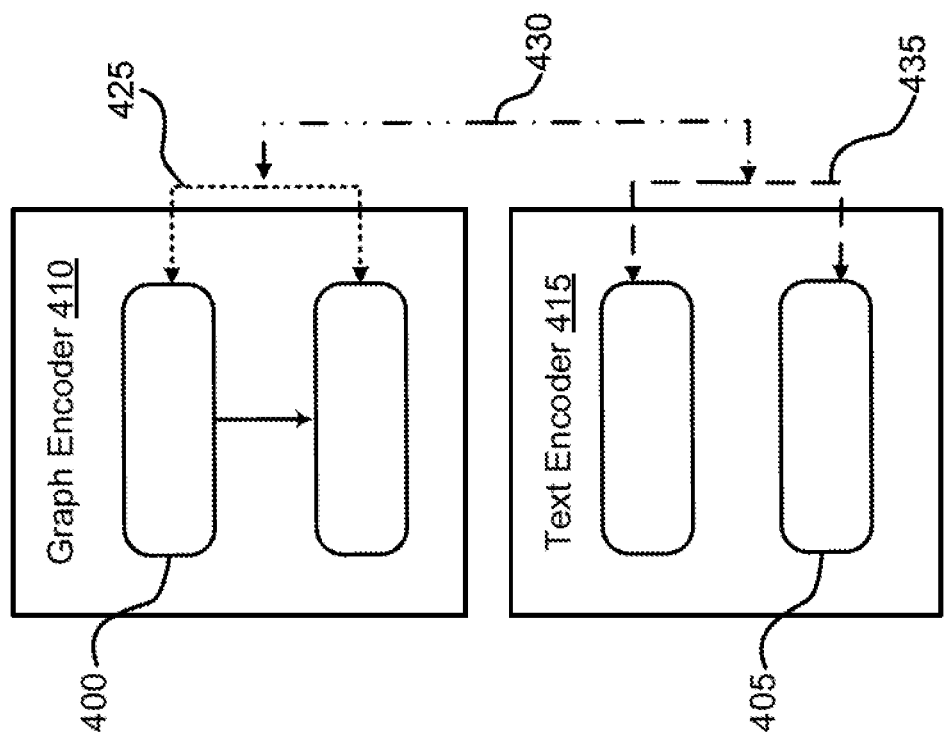

FIG. 4 shows an example of cross-attention fusion according to aspects of the present disclosure. The example shown includes source graph 400, modification query 405, graph encoder 410, text encoder 415, and feature fusion network 420. Feature fusion network 420 further includes graph attention 425, cross attention 430, and text attention 435, and joint embedding 440.

Source graph 400 is an example of, or includes aspects of, the corresponding element described with reference to FIG. 3. The source graph 400 is a scene graph including a set of nodes and a set of edges. In some cases, the source graph 400 is a structured representation of a search query from the user. The set of nodes represent objects while the set of edges represent relation or attributes between respective nodes.

Modification query 405 is an example of, or includes aspects of, the corresponding element described with reference to FIG. 3.

Graph encoder 410 is an example of, or includes aspects of, the corresponding element described with reference to FIG. 3.

According to an embodiment of the present disclosure, a graph-conditioned, sparsely connected transformer is used to encode the information from a graph. The transformer architecture depends on a grid of fully-connected self-attention to obtain the contextualized representations from a sequence of elements. The architecture of the graph encoder 410 with the sparely connected transformer is illustrated herein.

Compared to natural language text, graphs are structured data including components, nodes, and edges. To efficiently encode a graph, one embodiment of the present disclosure encodes the information not only from these constituent components, but also their interactions (i.e., the node-edge association and connectivity). Thus, the graph encoder 410 incorporates information from all the edges to the nodes from which these edges are originated. The edge-aware node embedding $x_i$ can be obtained from the list of source graph nodes and edges as follows:

$$x_i = \mathbf{T}^{\mathcal{N}}[x_i] + \sum_{j \in \mathcal{J}(i)} T^{\varepsilon}[x_{ij}] \quad (1)$$

where $\mathbf{T}^{\mathcal{N}}$ and $T^{\varepsilon}$ are the embedding tables for node and edge labels respectively, and $\mathcal{J}(i)$ is the set of nodes connected (both inbound and outbound) to the ith node in the graph.

After having the edge-aware node embeddings, the graph encoder 410 uses the sparsely connected transformer to learn the contextualized embeddings of the whole graph. The sparsely connected transformer might not incorporate the positional encoding into the graph inputs because the nodes are not in a predetermined sequence. Given the edge information from $x^\varepsilon$, the connectivity information is enforced by making nodes visible exclusively to its first order neighbor. The attention grid of the transformer is denoted as A. The following equation is defined, $A[x_i, x_j] = f(x_i, x_j)$ if $x_{i,j} \in x^\varepsilon$ or zero otherwise, where $f$ denotes the normalized inner product function.

According to an embodiment of the present disclosure, the sparsely connected transformer provides the graph node representations which are conditioned on the graph structure, using the edge labels in the input embeddings and sparse layers in self-attention. The node representations in the output of the sparsely connected transformer are denoted by $[m_{x_1}, \ldots, \mathbf{m}_{x_{|x^{\mathcal{N}}|}}]$.

Text encoder 415 is an example of, or includes aspects of, the corresponding element described with reference to FIG. 3. According to an embodiment of the present disclosure, a standard transformer encoder is used to encode the modification query $y=(y_1, \ldots, y_{|y|})$ into $[m_{y_1}, \ldots, m_{y_{|y|}}]$. To promote semantic alignment, the parameters of the graph encoder 410 and the text encoder 415 are shared with each other.

Feature fusion network 420 is an example of, or includes aspects of, the corresponding element described with reference to FIG. 3. According to some embodiments, there are two sources of information, which require a separate encoder for each of the two sources of information. One way is to incorporate two information sources through concatenation. The combined representation is as follows:

$$m = [m_{x_1}, \ldots, \mathbf{m}_{x_{|x^{\mathcal{N}}|}}, m_{y_1}, \ldots, m_{y_{|y|}}] \quad (2)$$

According to an embodiment of the present disclosure, the decoder component is responsible for information communication between the two encoders through its connections to them.

Some embodiments employ a technique that is referred to as late fusion via gating. To increase the ability of the model to combine the encoders' information for a better use, a parametric approach with the gating mechanism is herein applied. Through the gating mechanism, the neural network can filter useful information from the graph based on the modification query 405, and vice versa.

According to an embodiment of the present disclosure, a special token [CLS] is added to the graph in front of the query sentence. The representation of this special token in the encoders captures the holistic understanding, which is denoted by $\mathbf{m}_{x^{\mathcal{G}}}$ and $m_y$ for the graph and modification query, respectively. The neural network uses these holistic meaning vectors to filter useful information from the representations of the graph nodes $m_{x_i}$ and modification query tokens $m_{y_j}$ as follows:

$$g_{x_i} = \sigma(\text{MLP}(m_{x_i}, m_y)) \quad (3)$$

$$m'_{x_i} = g_{x_i} \odot m_{x_i} \quad (4)$$

$$g_{y_j} = \sigma(\text{MLP}(m_{y_j}, \mathbf{m}_{x^{\mathcal{G}}})) \quad (5)$$

$$m'_{y_j} = g_{y_j} \odot m_{y_j} \quad (6)$$

where MLP is a multi-layer perceptron, $\odot$ indicates an element-wise multiplication, and $\sigma$ is the element-wise sigmoid function used to construct the gates $g_{x_i}$ and $g_{y_j}$. The updated node $m'_{x_i}$ and token $m'_{y_j}$ are used in the joint encoder representation of equation 2.

This gating mechanism is referred to as late fusion since it might not allow the information from the graph and text to interact in their respective lower level encoders. For example, the fusion happens after the contextualized information has already been learned.

Some embodiments also employ a technique that is referred to as early fusion via cross-attention. To allow a deeper interaction between the graph encoder 410 and the text encoder 415, one embodiment employs fusing features at the early stage before the contextualized node $m_{x_i}$ and token $m_{y_j}$ representations are learned. This is achieved via cross-attention, an early fusion technique.

According to an embodiment, the parameters of the graph and query encoders are shared with each other to enable encoding of the two sources in the same semantic space. For example, the neural network uses the same transformer encoder for both sources. In cross-attention, the feature fusion network 420 concatenates the x (from equation 1) and y before the transformer encoder. As such, the encoder's input is [x, y]. In the transformer, the representation of each query token is updated by self-attending to the representations of all the query tokens and graph nodes in the previous layer. However, the representation of each graph node is updated by self-attending only to its graph neighbors according to the connections of the sparsely connected transformer as well as all query tokens. The final representation m is taken from the output of transformer.

Figure 5:
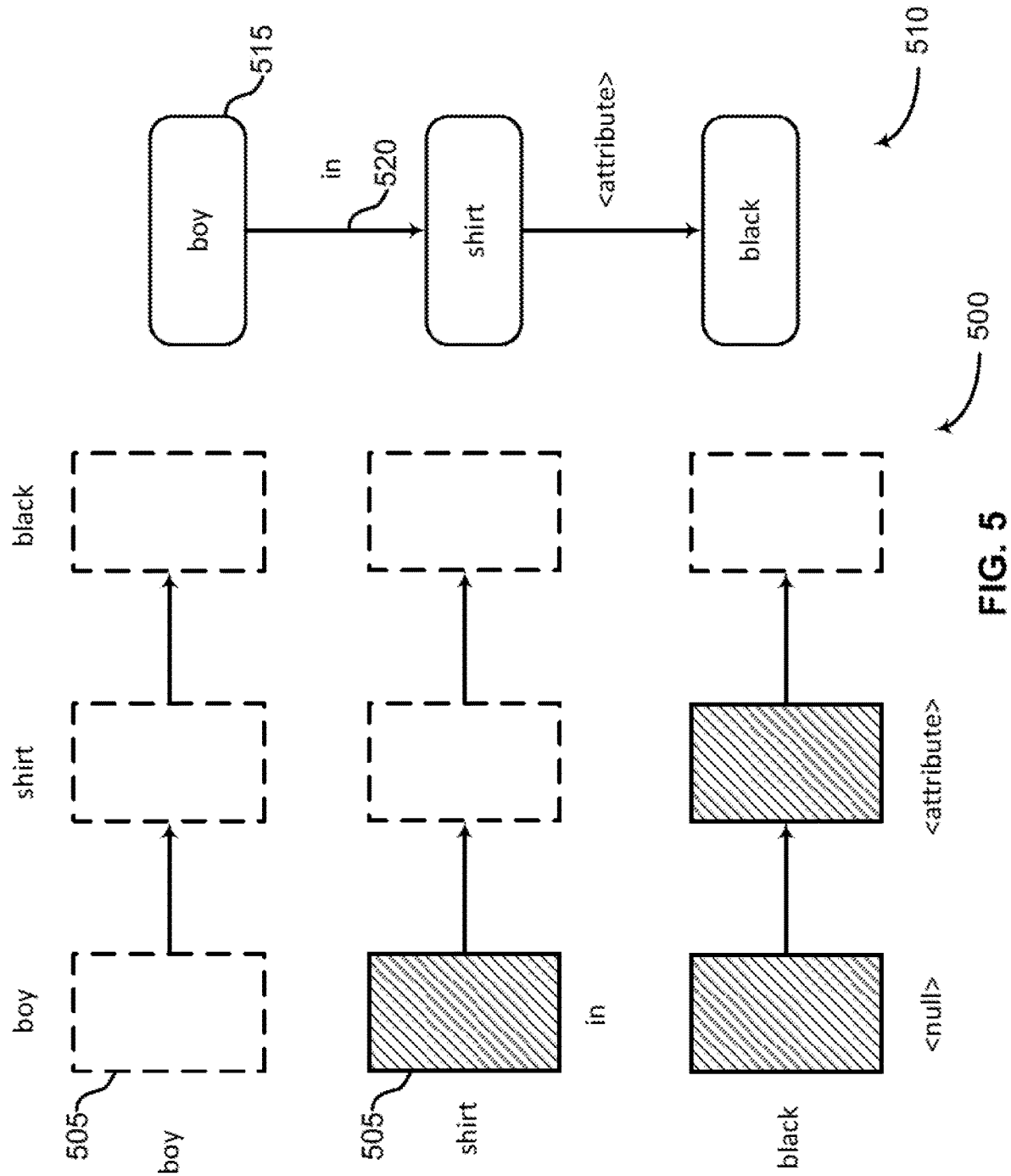
FIG. 5 shows an example of an adjacency matrix style edge decoder according to aspects of the present disclosure.

FIG. 5 shows an example of an adjacency matrix style edge decoder 500 according to aspects of the present disclosure. The example shown includes edge decoder 500 and graph 510. The source graph and text query (i.e., modification query) are encoded into a joint representation, then a target graph is generated in two stages. The target nodes are generated via a node-level RNN. Then, the model leverages another RNN to produce the target edges over the nodes.

In some cases, GRU cells are used for the RNN decoders. The node decoder includes a basic auto-regressive model:

$$\mathbf{h}_t^N = GRU^N(z_{t-1}, \mathbf{h}_{t-1}^N) \quad (7)$$

$$\mathbf{c}_t^N = ATTN^N(\mathbf{h}_t^N, m) \quad (8)$$

$$p(z_t | z_{<t}, \mathbf{x}^G, y) = \text{softmax}(W[\mathbf{h}_t^N, \mathbf{c}_t^N] + b) \quad (9)$$

where $z_{<t}$ denotes the nodes generated before time step t, $ATTN^N$ is a Luong-style attention, and m is the memory vectors from information fusion of the encoders.

Edge decoder 500 is an example of, or includes aspects of, the corresponding element described with reference to FIGS. 3 and 6. In one embodiment, edge decoder 500 includes decoder element 505. Decoder element 505 is an example of, or includes aspects of, the corresponding element described with reference to FIG. 6. In one embodiment, graph 510 includes node 515 and edge 520.

The edge decoder includes an adjacency matrix style edge decoder 500. The rows or columns of the adjacency matrix are labeled by the nodes in the order that they have been generated by the node-level decoder. adjacency matrix style edge decoder 500 includes for each row, an auto-regressive decoder which emits the label of each edge to other nodes from the edge vocabulary, including a special token [NULL] showing an edge does not exist. The lower-triangle part of the matrix is important for the adjacency matrix style edge decoder 500 because the node decoder generates the nodes in a topologically sorted manner. The dashed upper-triangle part of the adjacency matrix are used exclusively for parallel computation, and they will be discarded.

An attentional decoder including GRU units is used for generating edges. It operates similarly to the node-level decoder as shown in equations 8 and 9. For more accurate typed edge generation, however, the hidden states of the source and target nodes (from the node decoder) are incorporated as inputs when updating the hidden state of the edge decoder:

$$h_{i,j}^\varepsilon = GRU^\varepsilon(z_{i,j-1}, \mathbf{h}_i^N, \mathbf{h}_j^N, h_{i,j-1}^\varepsilon) \quad (10)$$

where $h_{i,j}^\varepsilon$ is the hidden state of the edge decoder for row i and column j, and $z_{i,j-1}$ is the label of the previously generated edge from node i to j-1.

Using an adjacency matrix style edge decoder 500 may have several consequences when generating edges. First, the dummy edges in the adjacency matrix cause a waste of computation. Second, the edges generated by the previous rows are not conditioned upon when the edges in the next row are generated. But it is still beneficial to use the information about the outgoing edges of the previous nodes to increase the generation accuracy of the outgoing edges of the next node.

Figure 6:
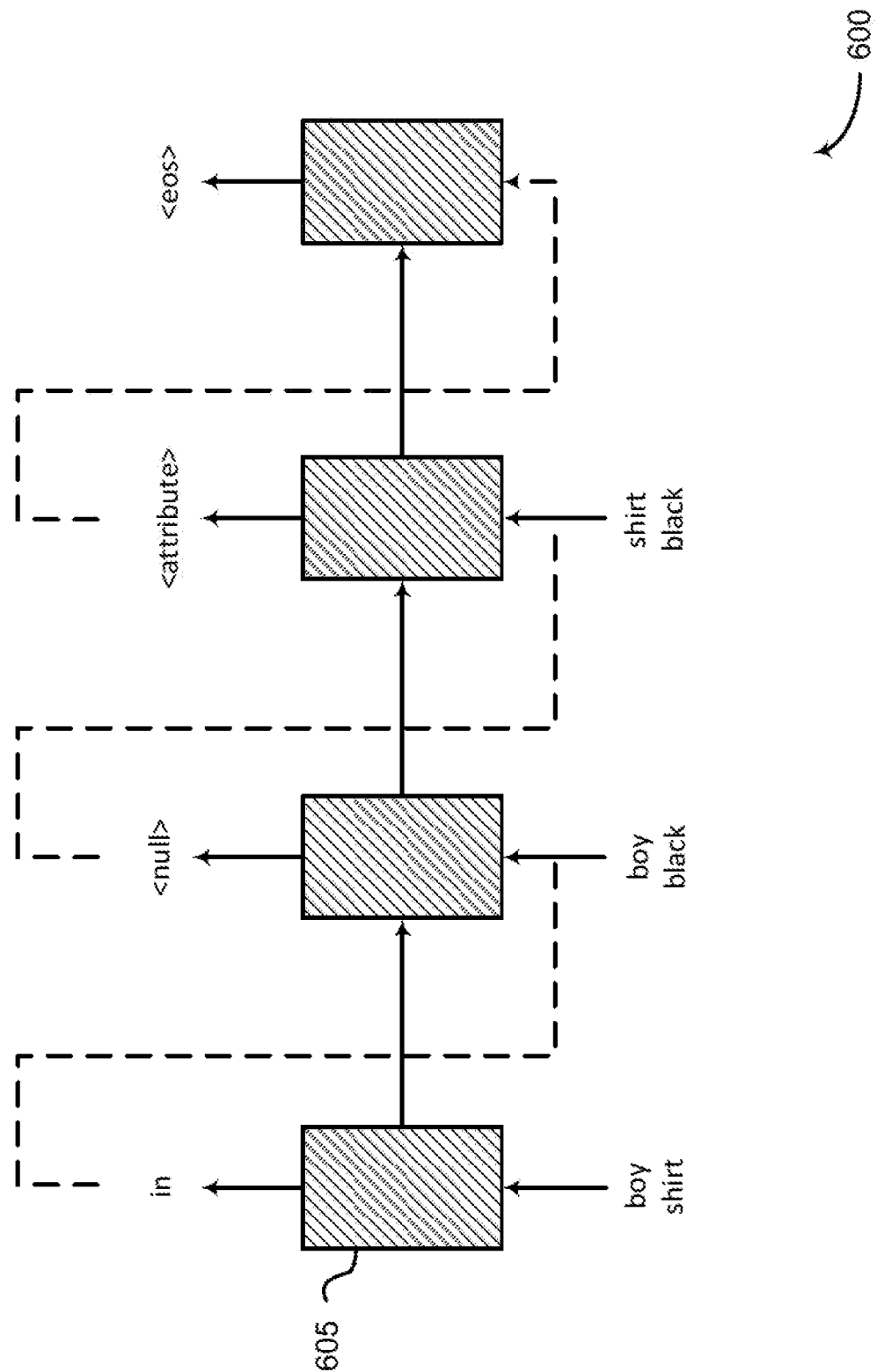
FIG. 6 shows an example of a flat edge-level decoder according to aspects of the present disclosure.

FIG. 6 shows an example of a flat edge-level decoder according to aspects of the present disclosure. Edge decoder 600 is an example of, or includes aspects of, the corresponding element described with reference to FIGS. 3 and 5. In one embodiment, edge decoder 600 includes decoder element 605. Decoder element 605 is an example of, or includes aspects of, the corresponding element described with reference to FIG. 5.

According to one embodiment of the present disclosure, a flat edge-level decoder 600 is used to flatten the lower-triangle of the adjacency matrix as illustrated in FIG. 5. The dummy edges are removed, and the rows of the lower triangular matrix are concatenated to form a sequence of pairs of nodes for which edges are generated between respective nodes. This edge generation method use information about all previously generated edges when a new edge is generated.

Figure 7:
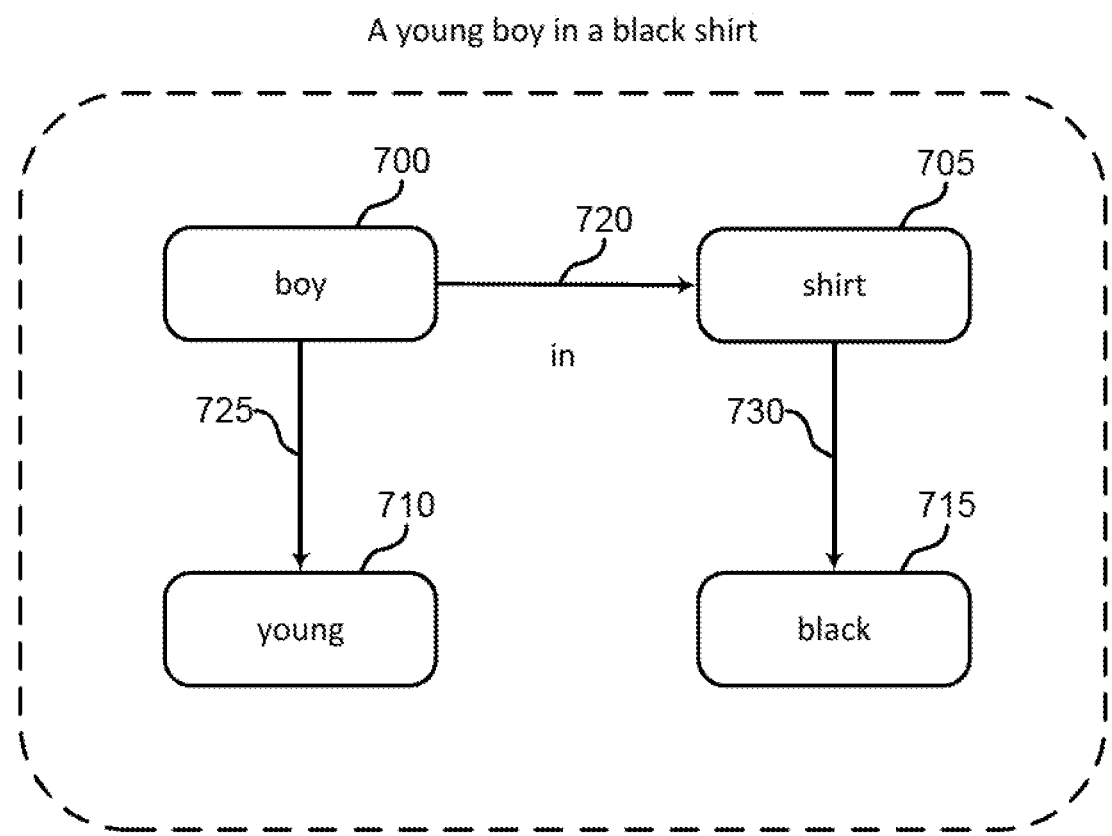
FIG. 7 shows an example of a scene graph according to aspects of the present disclosure.

FIG. 7 shows an example of a scene graph according to aspects of the present disclosure. The example shown includes first node 700, second node 705, third node 710, fourth node 715, first edge 720, second edge 725, and third edge 730.

Scene graphs may be referred to as semantic representations of images. A scene graph is a semantic formalism which represents the desired image as a graph of objects with relations and attributes. The semantic representation are adapted in retrieval systems. In some cases, a parser is used to parse a sentence into a list of objects, e.g., "boy" and "shirt". These objects and their associated attributes and relations form a group of triplets, e.g., (boy, in, shirt), (boy, attribute, young) and (shirt, attribute, black). For example, the graph generator may receive a referring expression as input and generate a parse tree that is mapped into a hierarchical subject, predicate, object (<S, P, O>) graph structure. Based on an initial scene graph and a new query from the user, the neural network generates a modified scene graph based on an existing scene graph and a modification query.

In some embodiments, the graph generator generates the structured representation using a parsing process that incorporates a "label attention model" in which attention heads of the graph generator network correspond to labels used for different syntactic categories to be assigned. In one embodiment, there is one attention head for each label. Thus, for example, a label attention head that determines whether a word corresponds to a "noun phrase" category pays attention to different parts of an input expression than a label attention head that determines whether the word corresponds to a "verb phrase" category.

In some embodiments, the graph generator employs object ontologies to understand image objects (e.g., that a "hiker" is a kind of "person") and to detect and classify object attributes (e.g., that "tan" is a color or "wooden" is a material). To improve the accuracy of the mappings between language objects and vision labels, some embodiments employ a grounding ontology that ensures consistent semantic mapping between language objects and vision labels.

Figure 8:
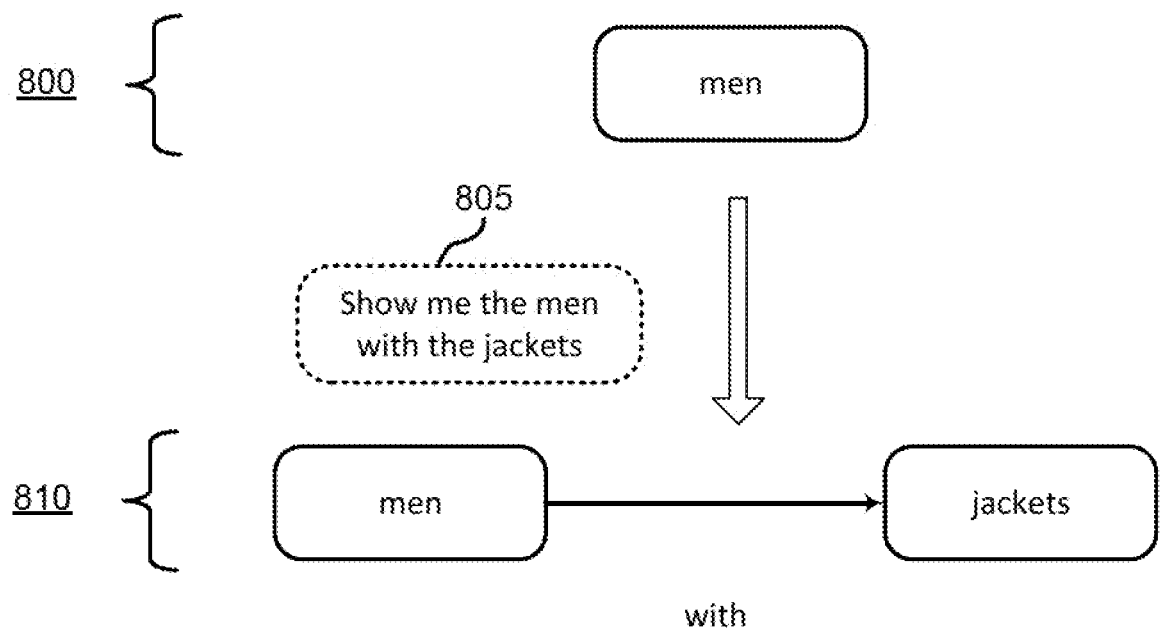
FIG. 8 shows an example of an insertion process according to aspects of the present disclosure.

FIG. 8 shows an example of an insertion process according to aspects of the present disclosure. The example shown includes source graph 800, modification query 805, and target graph 810. Source graph 800 is an example of, or includes aspects of, the corresponding element described with reference to FIGS. 3 and 4. Modification query 805 is an example of, or includes aspects of, the corresponding element described with reference to FIGS. 3 and 4. Target graph 810 is an example of, or includes aspects of, the corresponding element described with reference to FIG. 3.

One embodiment of the present disclosure includes steps to create data for the multi-operation graph modification (MGM) task. It is assumed that MGM depends on at least one operation on the source graph. The steps include using four actions (terminate, ins, del, sub) paired with a heuristic algorithm to perform operations on the modified graph. The model samples an action, and the action is executed on the last modified graph until the terminate is sampled or the available nodes are exhausted. In some cases, a large graph can support more modifications, while a smaller graph has less freedom. In addition, in one embodiment the modified nodes are not changed more than once. Hence, the probability of terminate may increase as the edit sequence gets longer, whereas the probabilities of other actions may drop. The heuristic algorithm is referred to as Algorithm 1 below, which provides a dataset having different edit sequence lengths.

---
Algorithm 1 Multiple operations for graph modifications
---

Input: G: scene graphs, I: insertion templates, D: deletion templates. S: substitution templates
Output: X: source graphs, Z: target graphs, Y: modified queries.

```
1:    X ← { }, Z ← { }, Y ← { }
2:    A ← {ins, del, sub},
3:    for k = 1 to |G| do
4:        g ← G_k
5:        a~uniform(A)
6:        if a == ins then
7:            s, q, t ← insertion(g, I)
8:        else if a == del then
9:            s, q, t ← deletion(g, D)
10:       else
11:           s, q, t ← substitution(g, S)
12:       end if
13:       A ← {terminate, ins, del, sub},
14:       ω ← {P, 1, 1, 1}. {P controls the average
              number of operations.}
15:       while True do
16:           total ← TotalNode(t)
17:           avail ← AvailableNode(t)
18:           if len(avail) == 0 then
19:               break
20:           end if
```

---
Algorithm 1 Multiple operations for graph modifications
---

Input: G: scene graphs, I: insertion templates, D: deletion templates. S: substitution templates
Output: X: source graphs, Z: target graphs, Y: modified queries.

```
21:           D ← softmax_ω ( (total+avail) / (total+γ) )
22:           a~sample(A, D)
23:           if a == terminate then
24:               break
25:           else if a == ins then
26:               s, q', t ← insertion(s, t, I)
27:           else if a == del then
28:               s, q', t ← deletion(s, t, D)
29:           else
30:               s, q', t ← substitutions(s, t, S)
31:           end if
32:       end while
33:       q ← concat(q, q')
34:       X ← X ∪ {s}, Z ← Z ∪ {t}, Y ← Y ∪ {q}
35:   end for
36:   return X, Z, Y
```

According to an embodiment, a scene graph includes semantic representations of an image. In some cases, a parser is used to parse a sentence (i.e., a search query) into a list of objects (e.g., "boy", "shirt"). These objects and their associated attributes and relations form a group of triplets. According to an embodiment of the present disclosure, given a scene graph $\mathcal{G}$, a triplet (x, y, z) is constructed, where x is the source graph, y is the modification query, and z represents the target graph. One embodiment of the present disclosure uniformly selects and applies an action a from the set of possible graph modification operations A={insert, delete, substitute}. The actions (e.g., delete, insert, and substitute) are applied to the source graph based on the user's search entry or the modification query.

According to an embodiment, the actions include insert command. Insertion can be treated as the inversion of delete operation. One embodiment produces the source graph x via a "delete" operation on $\mathcal{G}$, where the target graph z is set to $\mathcal{G}$. Similar to the deletion operator, the insertion query (i.e., an example of a modification query) y is generated by either workers from a crowdsourcing application (e.g., Mechanical Turk), or by templates. In most cases, the crowdsourcing application is used to obtain training data to train the neural network to modify an existing scene graph based on the modification query. For example, the source graph 800 includes a node (i.e., men). The modification query 805 includes a natural language expression, "show me the men with the jackets". The target graph 810 has two nodes connected by an edge. The two nodes include men and jackets which correspond to the insertion command from the modification query 805.

Figure 9:
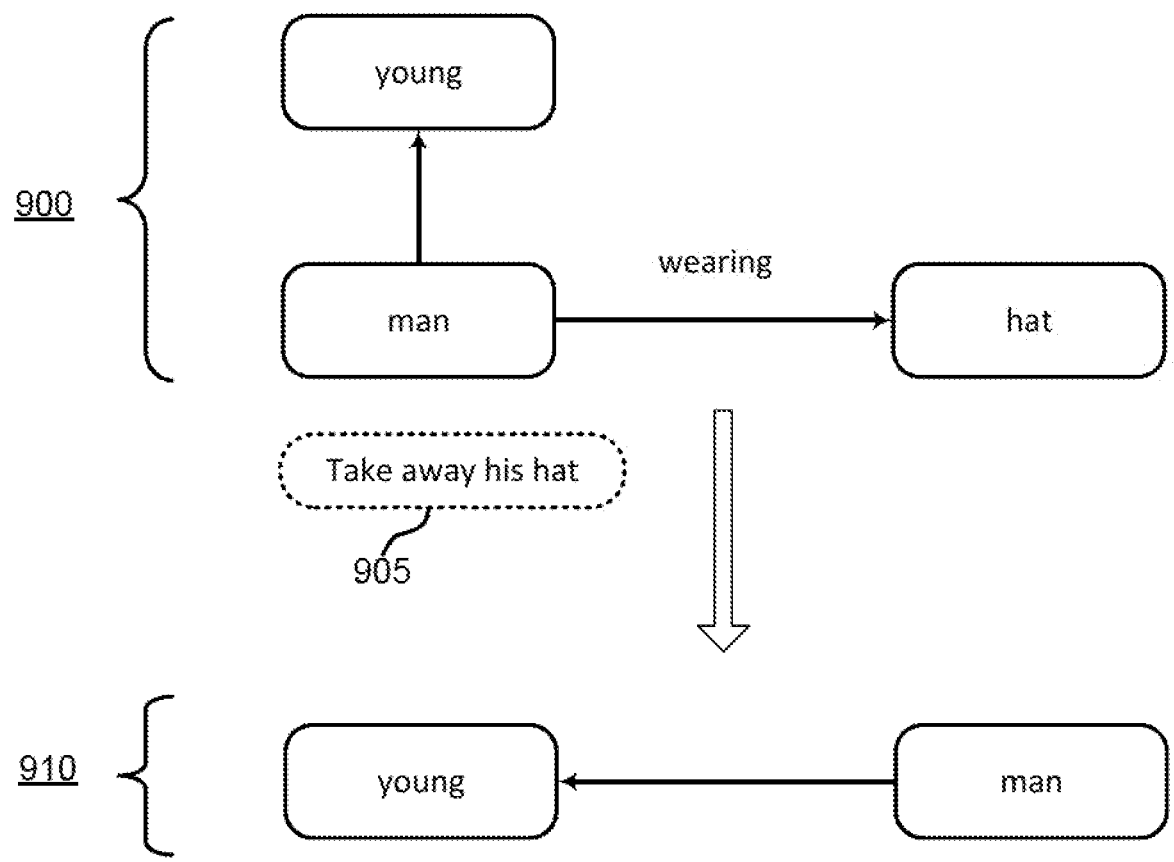
FIG. 9 shows an example of a deletion process according to aspects of the present disclosure.

FIG. 9 shows an example of a deletion process according to aspects of the present disclosure. The example shown includes source graph 900, modification query 905, and target graph 910.

Source graph 900 is an example of, or includes aspects of, the corresponding element described with reference to FIGS. 3 and 4. Modification query 905 is an example of, or includes aspects of, the corresponding element described with reference to FIGS. 3 and 4. Target graph 910 is an example of, or includes aspects of, the corresponding element described with reference to FIG. 3.

According to an embodiment of the present disclosure, actions include delete operation. A node is randomly selected from $\mathcal{G}$ (denoting the source graph x), and the system removes this node and its associated edges. The remaining nodes and edges are denoted as the target graph z. The modification query y is generated from a randomly selected deletion template or by workers from a crowdsourcing application. For example, the source graph 900 has three nodes (i.e., objects) and two edges (i.e., attributes). The nodes are "young", "man", and "hat". The edges include "wearing". The objects and their associated attributes and relations form a group of triplets, (man, attribute, young) and (man, wearing, hat). The source graph 900 is a scene graph which is a semantic representation of a search query, "a young man wearing hat". The modification query 905 includes a natural language expression "take away his hat". The target graph 910 includes two nodes and one edge. The objects and their associated attributes and relations form a triplet (man, attribute, young). In some cases, the templates are based upon a dataset (e.g., the Edit Me dataset) and a crowdsourcing application (e.g., Mechanical Turk). The crowdsourcing application is used to obtain training data to train the neural network to modify an existing scene graph (e.g., the source graph 900) based on the modification query 905.

Figure 10:
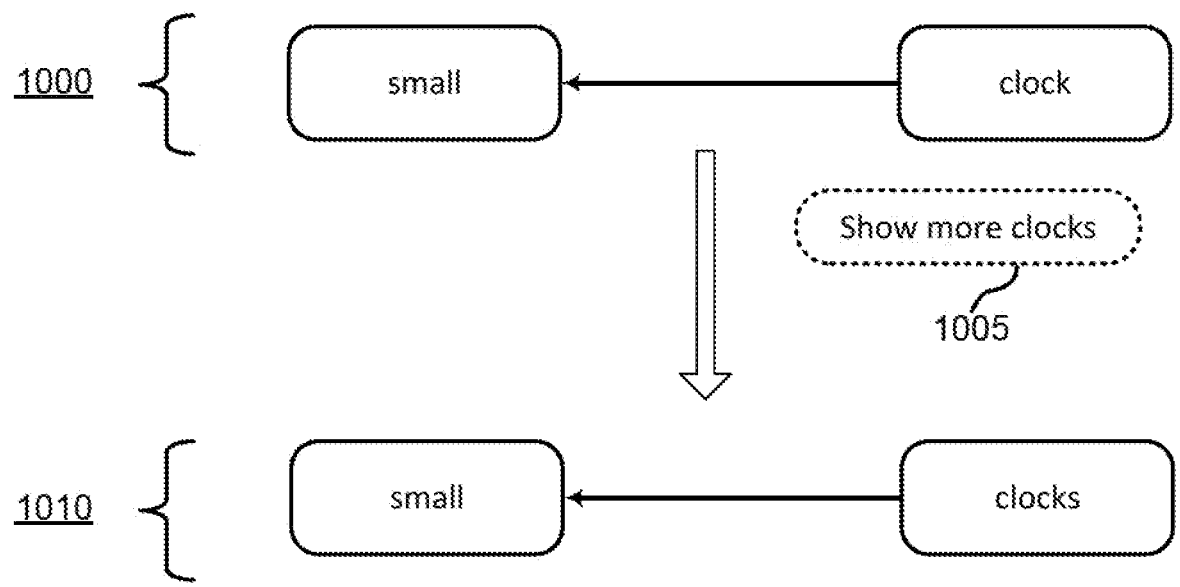
FIG. 10 shows an example of an object substitution process according to aspects of the present disclosure.

FIG. 10 shows an example of an object substitution process according to aspects of the present disclosure. According to an embodiment of the present disclosure, the actions include substitute operation (i.e., object substitution, attribute substitution). The example shown includes source graph 1000, modification query 1005, and target graph 1010. Source graph 1000 is an example of, or includes aspects of, the corresponding element described with reference to FIGS. 3 and 4. Modification query 1005 is an example of, or includes aspects of, the corresponding element described with reference to FIGS. 3 and 4. Target graph 1010 is an example of, or includes aspects of, the corresponding element described with reference to FIG. 3.

According to an embodiment, a randomly selected node from the source graph 1000 is replaced with a semantically similar node to obtain the target graph. To locate the new node, AllenNLP toolkit may be used to have a list of candidate words based on their semantic similarity scores to the old node. For example, the source graph 1000 has two nodes (i.e., objects) and one edge (i.e., attributes). The nodes are "small" and "clock". The objects and their associated attributes and relations form a triplet, (small, attribute, clock). The source graph 1000 is a scene graph which is a semantic representation of a search query (i.e., small clock). The modification query 1005 includes a natural language expression "show more clocks". The target graph 1010 has two nodes and one edge. The objects and their associated attributes and relations form a triplet (small, attribute, clocks). The node representing "clock" (i.e., singular) is replaced with the new node representing "clocks" (i.e., plural).

Figure 11:
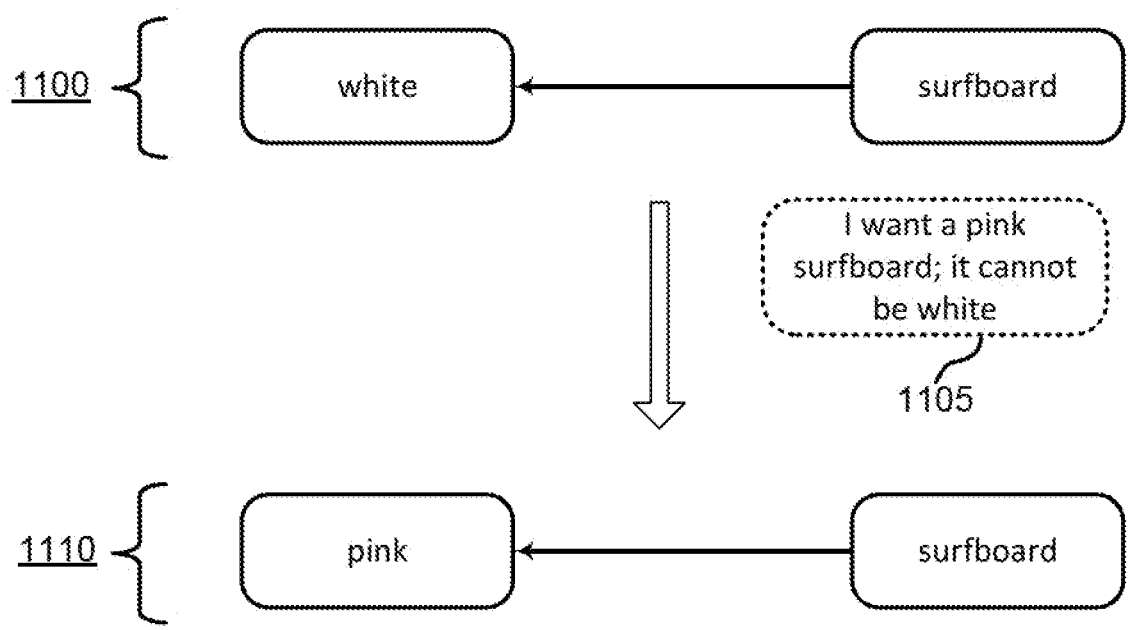
FIG. 11 shows an example of an attribute substitution process according to aspects of the present disclosure.

FIG. 11 shows an example of an attribute substitution process according to aspects of the present disclosure. According to an embodiment of the present disclosure, the actions include substitute operation (i.e., object substitution, attribute substitution). The example shown includes source graph 1100, modification query 1105, and target graph 1110. Source graph 1100 is an example of, or includes aspects of, the corresponding element described with reference to FIGS. 3 and 4. Modification query 1105 is an example of, or includes aspects of, the corresponding element described with reference to FIGS. 3 and 4. Target graph 1110 is an example of, or includes aspects of, the corresponding element described with reference to FIG. 3.

According to an embodiment, a randomly selected node from the source graph 1100 is replaced with a semantically similar node to obtain the target graph. To locate the new node, AllenNLP toolkit may be used to have a list of candidate words based on their semantic similarity scores to the old node. For example, the source graph 1100 has two nodes (i.e., objects) and one edge (i.e., attributes). The nodes are "white" and "surfboard". The objects and their associated attributes and relations form a triplet, (surfboard, attribute, white). The source graph 1100 is a scene graph which is a semantic representation of a search query, a white surfboard. The modification query 1105 includes a natural language expression "I want a pink surfboard; it cannot be white". The target graph 1110 has two nodes and one edge. The objects and their associated attributes and relations form a triplet (pink, attribute, surfboard). The node representing "white" is replaced with the new node representing "pink".

Figure 12:
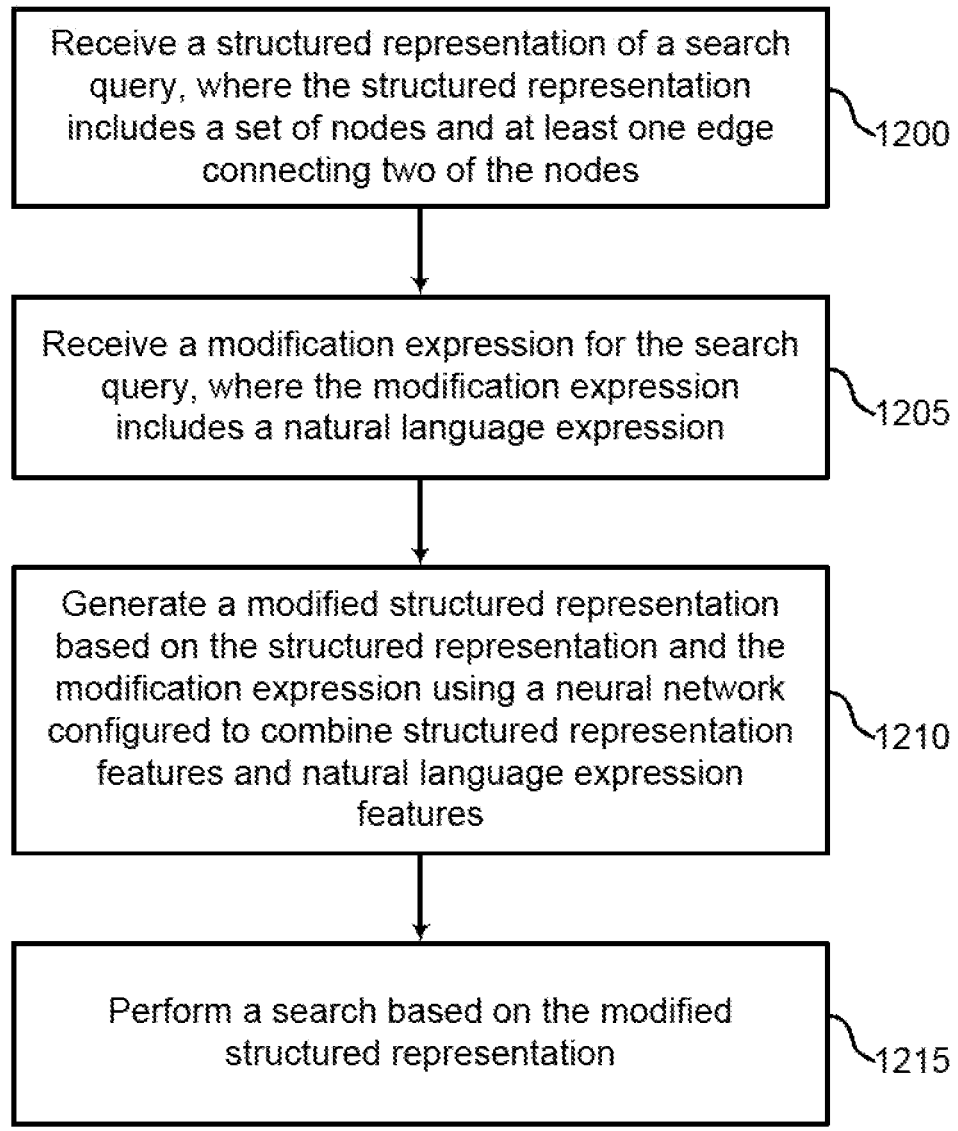
FIG. 12 shows an example of a process for natural language processing according to aspects of the present disclosure.

FIG. 12 shows an example of a process for natural language processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1200, the system receives a structured representation of a search query, where the structured representation includes a set of nodes and at least one edge connecting two of the nodes. The set of nodes represents objects and edges represent associated attributes and relations. In one example, a search query is "a young boy in a black shirt" which can be denoted by a structured representation. The structured representation includes four nodes and three edges. The nodes represent four objects (i.e., boy, shirt, young, black). The edges include attributes such as "in" (i.e., convey a relation between the two objects). These objects and their associated attributes and relations form a group of triplets, e.g., (boy, in, shirt), (boy, attribute, young) and (shirt, attribute, black). In some cases, the operations of this step refer to, or may be performed by, an input component as described with reference to FIG. 2.

At operation 1205, the system receives a modification expression for the search query, where the modification expression includes a natural language expression. According to an embodiment, the modification expression is used to modify the source graph according to an operation or action. One embodiment uniformly selects and applies an action a from the set of all possible graph modification operations A={INSERT, DELETE, SUBSTITUTE}. The actions (e.g., delete, insert, and substitute) are applied to the source graph. In some cases, the operations of this step refer to, or may be performed by, an input component as described with reference to FIG. 2.

According to an embodiment, the modification query is generated from a randomly selected deletion template or by workers from a crowdsourcing application. For example, the source graph is a scene graph which is a semantic representation of a search query, "a young man wearing hat". The modification query includes a natural language expression "take away his hat".

At operation 1210, the system generates a modified structured representation based on the structured representation and the modification expression using a neural network configured to combine structured representation features and natural language expression features. In some cases, the operations of this step refer to, or may be performed by, a neural network as described with reference to FIGS. 2 and 3.

According to an embodiment, the neural network includes an encoder-decoder architecture having a graph encoder, a text encoder, a feature fusion network, edge decoder and a node decoder. The graph encoder includes a graph-conditioned, sparsely connected transformer. The graph encoder is used to generate structured representation features based on the structured representation. The text encoder is used to generate natural language expression features based on the modification expression. In some embodiments, early feature fusion model and late feature fusion model are used for combining information from an input text (i.e., modification query) and a source graph. One embodiment formulates the task as a conditional generation task. Given a source graph and a modification query, the neural network can produce a target graph by maximizing a conditional probability.

At operation 1215, the system performs a search based on the modified structured representation. The search may be performed by an image search engine from a database of images. A user utilizes the image search engine to trace the source of a target image or find additional images similar or related to the target image. The user is requested to enter a search query in the search box and/or use filters for more in-depth searching. In some cases, the operations of this step refer to, or may be performed by, a search component as described with reference to FIG. 2.

Figure 13:
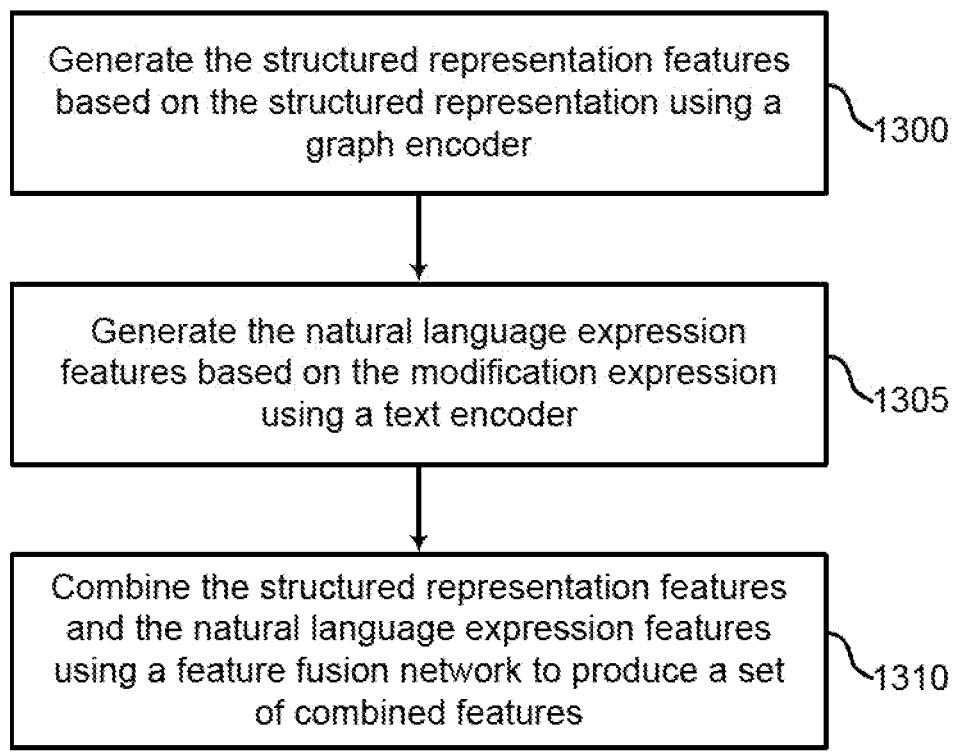
FIG. 13 shows an example of a process for combining graph features and text features according to aspects of the present disclosure.

FIG. 13 shows an example of a process for combining graph features and text features according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1300, the system generates the structured representation features based on the structured representation using a graph encoder. In some cases, the operations of this step refer to, or may be performed by, a graph encoder as described with reference to FIGS. 3 and 4.

According to an embodiment of the present disclosure, an encoder-decoder framework takes a source graph and a modification query as inputs, hence the network framework includes a graph encoder and a text encoder to model the graph and text information respectively. The neural network includes five components, the graph encoder, the text encoder, the feature fusion network, the edge decoder, and the node decoder.

A graph-conditioned, sparsely connected transformer is used to encode the information from a source graph. The source graph and modification query are encoded into a joint representation. Compared to natural language text, graphs are structured data including components, nodes, and edges. To efficiently encode a graph, one embodiment of the present disclosure encodes the information not only from these constituent components, but also their interactions (i.e., the node-edge association and connectivity). Thus, the graph encoder incorporates information from all the edges to the nodes from which these edges are originated. The edge-aware node embedding is obtained from the list of source graph nodes and edges as illustrated in equation 1, where embedding tables for node and edge labels are generated respectively. The set of nodes connected (both inbound and outbound) to the ith node in the graph is created. After getting the edge-aware node embeddings, the graph encoder uses the sparsely connected transformer to learn the contextualized embeddings of the whole graph. Sparsely connected transformer might not incorporate the positional encoding into the graph inputs because the nodes are not in a predetermined sequence. Given the edge information from $x^e$, the connectivity information is enforced by making nodes visible exclusively to its first order neighbor. The attention grid of the transformer is computed.

According to an embodiment of the present disclosure, the sparsely connected transformer provides the graph node representations which are conditioned on the graph structure, using the edge labels in the input embeddings and sparse layers in self-attention. The node representations in the output of the sparsely connected transformer are denoted by $[m_{x_1}, \ldots, m_{x_{|x^N|}}]$.

At operation 1305, the system generates the natural language expression features based on the modification expression using a text encoder. In some cases, the operations of this step refer to, or may be performed by, a text encoder as described with reference to FIGS. 3 and 4.

According to an embodiment of the present disclosure, a standard transformer encoder is used to encode the modification query. To promote semantic alignment, the parameters of the graph encoder and the text encoder are shared with each other.

At operation 1310, the system combines the structured representation features and the natural language expression features using a feature fusion network to produce a set of combined features. According to some embodiments, there are two sources of information, which require an encoder for each of the two sources. One way is to incorporate two information sources through concatenation. The combined representation is illustrated above in equation 2. In some cases, the operations of this step refer to, or may be performed by, a feature fusion network as described with reference to FIGS. 3 and 4.

To increase the ability of the model to combine the encoders' information for a better use, some embodiments of the present disclosure introduce a parametric approach with the gating mechanism. Through the gating mechanism, the model can filter useful information from the graph based on the modification query, and vice versa. According to an embodiment of the present disclosure, a special token [CLS] is added to the graph in front of the query sentence. The representation of this token in the encoders captures the holistic understanding. The model uses these holistic meaning vectors to filter useful information from the representations of the graph nodes and modification query tokens. The element-wise sigmoid function used to construct the gates. The updated node and token are used in the joint encoder representation. This gating mechanism is referred to as late fusion since it does not allow the information from the graph and text to interact in their respective lower level encoders. For example, the fusion happens after the contextualized information has already been learned.

According to an embodiment, the feature fusion network uses early fusion via cross-attention. To allow a deeper interaction between the graph and text encoders, one embodiment fuses features at the early stage before the contextualized node and token representations are learned. This is achieved via cross-attention, an early fusion technique.

According to an embodiment, the parameters of the graph and query encoders are shared to enable encoding of the two sources in the same semantic space. For example, the model uses the same transformer encoder for both sources. In cross-attention, the model concatenates the x (from equation 1) and y before the transformer encoder. As such, the encoder's input is [x, y]. In the transformer, the representation of each query token is updated by self-attending to the representations of all the query tokens and graph nodes in the previous layer. However, the representation of each graph node is updated by self-attending only to its graph neighbors according to the connections of the sparsely connected transformer as well as all query tokens. The final representation m is taken from the output of transformer.

Figure 14:
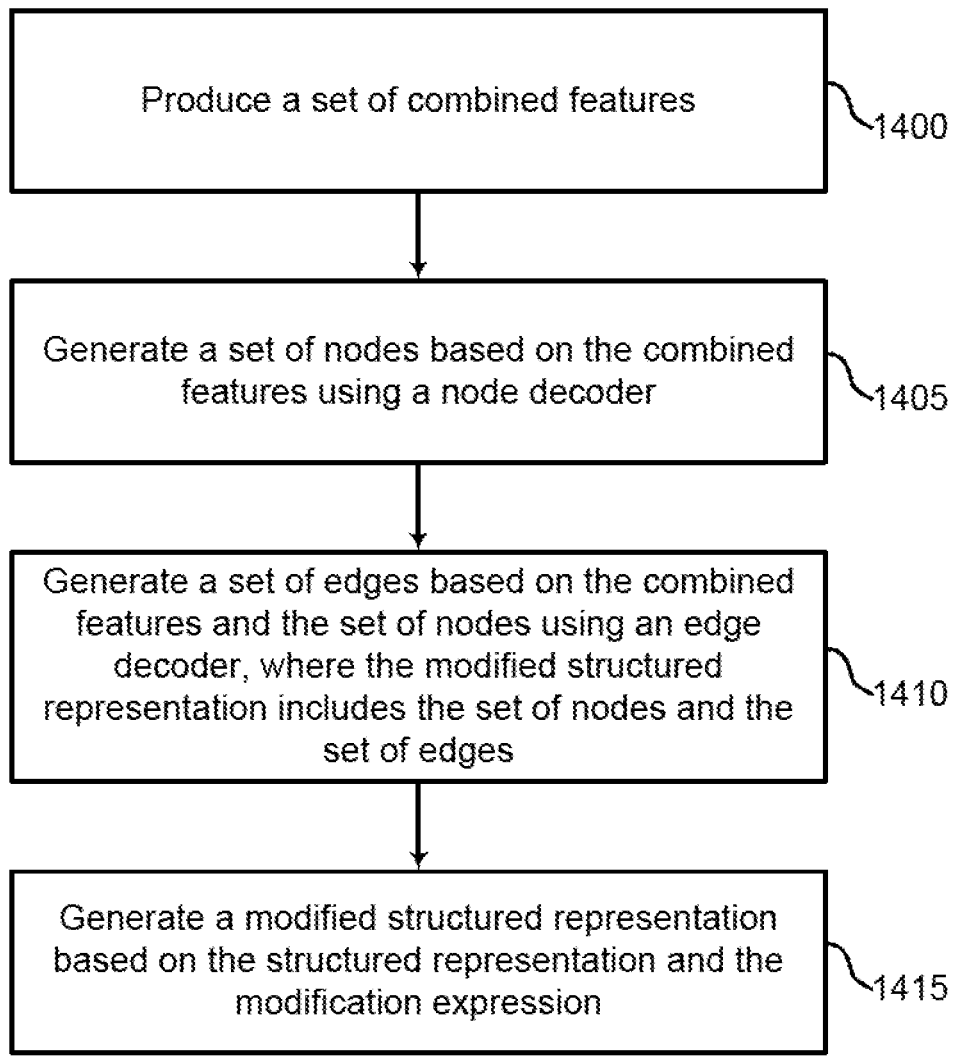
FIG. 14 shows an example of a process for generating a modified structured representation based on combined features according to aspects of the present disclosure.

FIG. 14 shows an example of a process for generating a modified structured representation based on combined features according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1400, the system produces a set of combined features. According to some embodiments, a feature fusion network is used to combine the structured representation features (from the graph encoder) and the natural language expression features (from the text encoder) to produce a set of combined features. In some cases, the operations of this step refer to, or may be performed by, a feature fusion network as described with reference to FIGS. 3 and 4.

At operation 1405, the system generates a set of nodes based on the combined features using a node decoder. In some cases, the operations of this step refer to, or may be performed by, a node decoder as described with reference to FIG. 3.

According to an embodiment, the node decoder includes an RNN. In some cases, GRU cells are used for the RNN decoder. The node decoder includes a basic auto-regressive model.

At operation 1410, the system generates a set of edges based on the combined features and the set of nodes using an edge decoder, where the modified structured representation includes the set of nodes and the set of edges. In some cases, the operations of this step refer to, or may be performed by, an edge decoder as described with reference to FIGS. 3, 5, and 6.

According to an embodiment, the edge decoder applies an adjacency style generation method. The rows or columns of the adjacency matrix are labeled by the nodes in the order that they have been generated by the node decoder. For each row, an auto-regressive decoder emits the label of each edge to other nodes from the edge vocabulary, including a special token [NULL] showing an edge does not exist. The lower-triangle part of the matrix is important as it is assumed that the node decoder generates the nodes in a topologically sorted manner. The dashed upper-triangle part of the adjacency matrix is used exclusively for parallel computation, and they will be discarded.

According to an embodiment, an attentional decoder using GRU units is used for generating edges. The attentional (edge) decoder operates in a similar fashion as the node decoder. For more accurate typed edge generation, the hidden states of the source and target nodes (from the node decoder) are incorporated as inputs when updating the hidden state of the edge decoder.

There are a number of consequences of using this edge generation method. Firstly, the dummy edges in the adjacency matrix cause a waste of computation. Secondly, the edges generated by the previous rows are not conditioned upon when the edges in the next row are generated. But it may be beneficial to use the information about the outgoing edges of the previous nodes to increase the generation accuracy of the outgoing edges of the next node. Hence, one embodiment of the present disclosure flattens the lower-triangle of the adjacency matrix. The dummy edges are removed, and the rows of the lower triangular matrix are concatenated to form a sequence of pairs of nodes when edges are generated between respective nodes. This flat edge-level decoder uses information about all previously generated edges when a new edge is generated.

At operation 1415, the system generates a modified structured representation based on the structured representation and the modification expression. In some cases, the operations of this step refer to, or may be performed by, a neural network as described with reference to FIGS. 2 and 3.

Figure 15:
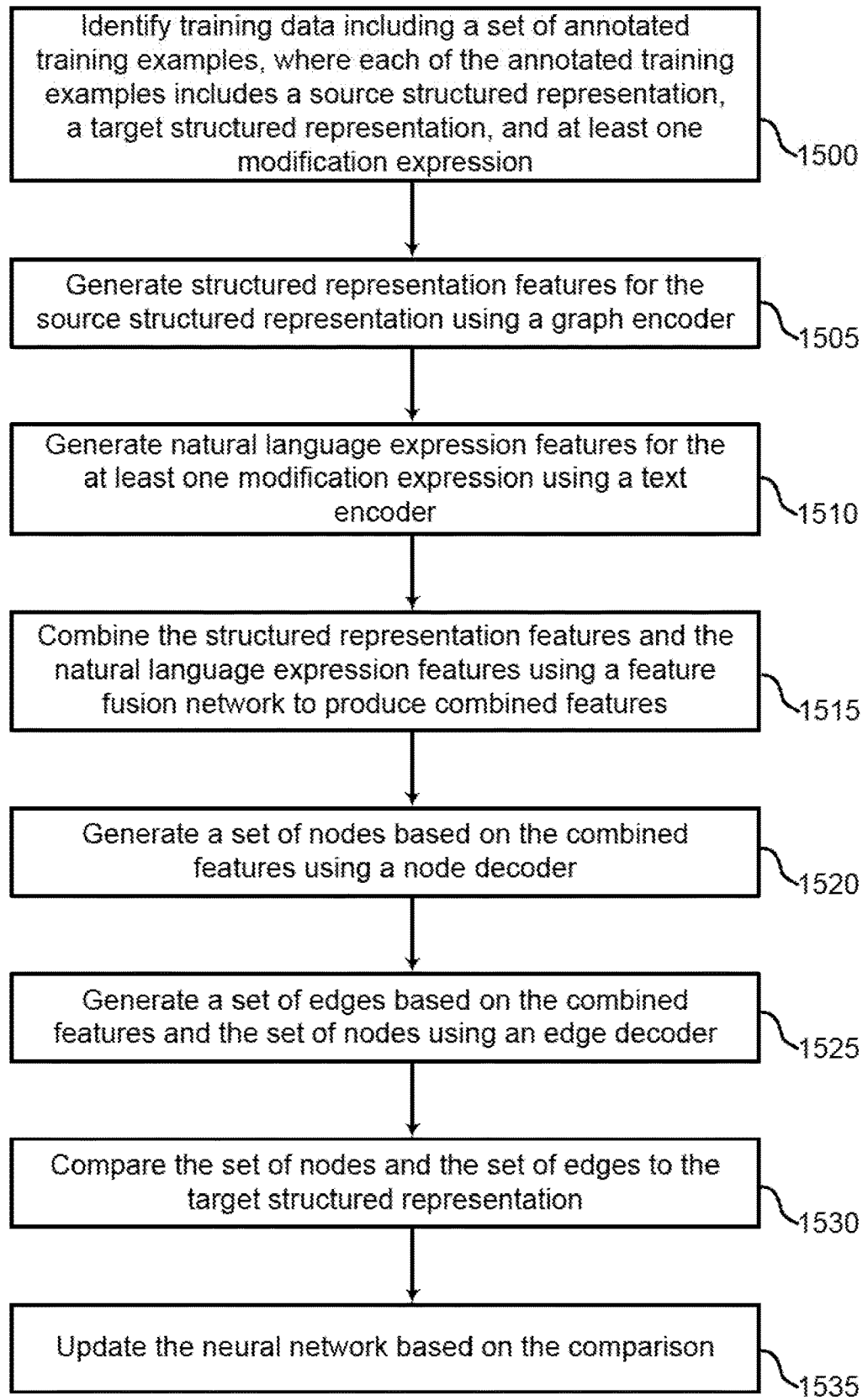
FIG. 15 shows an example of a process for training a neural network for natural language processing according to aspects of the present disclosure.

FIG. 15 shows an example of a process for training a neural network for natural language processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

One embodiment formulates the task as a conditional generation task. Formally, given a source graph $x^G$ and a modification query y, one can produce a target graph $z^G$ by maximizing the conditional probability $p(z^G|x^G, y)$. As a graph consists of a list of typed nodes and edges, the conditional probability is further decomposed as:

$$p(z^G|x^G,y) = p(z^N|x^G,y) \times p(z^\varepsilon|x^G,y,z^N) \qquad (11)$$

where $z^N$ and $z^\varepsilon$ respectively denote the nodes and edges of the graph $z^G$.

Given a training dataset of input-output pairs, denoted by $\mathcal{D} = \{x_d^G, y_d, z_d^G\}_{d=1}^D$, the model is trained by maximizing the conditional log-likelihood $l_{CLL} = l_{Node} + l_{Edge}$ where, $$l_{Node} = \sum_{(x,y,z) \in \mathcal{D}} \log p(z^N | x, y; \theta_N) \qquad (12)$$

$$l_{Edge} = \sum_{(x,y,z) \in \mathcal{D}} \log p(z^\varepsilon | x, y, z^N; \theta_\varepsilon) \qquad (13)$$

During learning and decoding, the nodes are sorted according to a topological order which exists for all the directed graphs in the user-generated and synthetic datasets.

According to an embodiment of the present disclosure, the graph encoder includes three stacked sparse transformers, with four heads at each layer. The embedding size is 256, and the inner-layer of feed-forward networks has a dimension of 512. Both node-level and edge-level decoders are one-layer GRU-RNN with a hidden size of 256, and the size of embeddings are 256 as well. 30 epochs and 300 epochs are trained for synthetic and user-generated data respectively, with a batch size of 256. The model is evaluated over the development (dev) set every epoch, and the checkpoint is selected with the best graph accuracy for the inference. For example, the experiments are run on a single Nvidia Tesla V100. Gated recurrent units (GRUs) are a gating mechanism in recurrent neural networks. The GRU is similar to a long short-term memory (LSTM) with a forget gate but has fewer parameters than LSTM, as it lacks an output gate.

Graphics processing unit (GPU) time (ms/step) over different settings at training stage are measured. The cross-attention model of the present disclosure is more efficient than other models in terms of GPU computing time. Number of parameters over different settings are also measured and recorded. The number of parameters used for each model is recorded.

Performance on the validation/dev set of the models and the best baseline are recorded. Based on the results, there is no significant difference between the performance trend in the dev set and the test set.

At operation 1500, the system identifies training data including a set of annotated training examples, where each of the annotated training examples includes a source structured representation, a target structured representation, and at least one modification expression.

At operation 1505, the system generates structured representation features for the source structured representation using a graph encoder. According to an embodiment of the present disclosure, a graph-conditioned, sparsely connected transformer is used to encode the information from a graph. The graph encoder incorporates information from all the edges to the nodes from which these edges are originated. After having edge-aware node embeddings, the graph encoder uses the sparsely connected transformer to learn the contextualized embeddings of the entire graph. In some cases, the operations of this step refer to, or may be performed by, a graph encoder as described with reference to FIGS. 3 and 4.

At operation 1510, the system generates natural language expression features for the at least one modification expression using a text encoder. According to an embodiment of the present disclosure, the text encoder includes a basic transformer encoder which is used to encode the modification expression. In some cases, the operations of this step refer to, or may be performed by, a text encoder as described with reference to FIGS. 3 and 4.

At operation 1515, the system combines the structured representation features and the natural language expression features using a feature fusion network to produce combined features. According to some embodiments, the two information sources (i.e., graph and text query) are combined through concatenation. Early feature fusion model and late feature fusion model are used for combining information from the graph and input text. In some cases, the operations of this step refer to, or may be performed by, a feature fusion network as described with reference to FIGS. 3 and 4.

To increase the ability of the model to combine the encoders' information for a better use, a parametric approach with the gating mechanism is herein used. Through the gating mechanism, the model can filter useful information from the graph based on the modification query, and vice versa. The gating mechanism is referred to as late fusion since it might not allow the information from the graph and text to interact in their respective lower level encoders. For example, the fusion happens after the contextualized information has already been learned.

According to an embodiment, to allow a deeper interaction between the graph and text encoders, cross-attention (an early fusion technique) is used to fuse features at the early stage before the contextualized node and token representations are learned.

At operation 1520, the system generates a set of nodes based on the combined features using a node decoder. According to an embodiment of the present disclosure, the node decoder includes an RNN. In addition, GRU cells are used for the RNN decoder. The node decoder includes a basic auto-regressive model. In some cases, the operations of this step refer to, or may be performed by, a node decoder as described with reference to FIG. 3.

At operation 1525, the system generates a set of edges based on the combined features and the set of nodes using an edge decoder. According to an embodiment of the present disclosure, the edge decoder includes an adjacency matrix decoder. Alternatively, the edge decoder includes a flat edge-level decoder. In some cases, the operations of this step refer to, or may be performed by, an edge decoder as described with reference to FIGS. 3, 5, and 6.

At operation 1530, the system compares the set of nodes and the set of edges to the target structured representation. According to an embodiment of the present disclosure, training data is input into the neural network. The neural network generates predicted structured representation (i.e., the set of nodes and the set of edges) using the encoder-decoder architecture. The target structured representation is ground-truth value for comparison. For each training iteration, a loss function is used to compute or estimate the loss (or error) between the predicted structured representation and the target structured representation.

At operation 1535, the system updates the neural network based on the comparison. After each training iteration, parameters of the neural network are updated (e.g., using gradient descent). As the neural network model is trained, the parameters (weights and biases) are adjusted in a way that the loss function is minimized.

Evaluation

Although there are several scene graphs annotated datasets for images, the alignments between graphs and text are not available. Further, image grounded scene graphs (e.g., the Visual Genome dataset) also contain many non-salient objects and relations, while search queries focus more on the main objects and their connections. According to an embodiment of the present disclosure, benchmark datasets are created due to lack of large-scale and high-quality datasets. Three datasets are created to evaluate the models through a data creation process. The data creation process begins with captioning datasets such as MSCOCO and Google conceptual captioning (GCC). To construct scene graphs, the process uses a scene graph parser to parse a random subset of MSCOCO description data and GCC captions. The parser is built upon a dependency parser. In some cases, the process includes methods of generating modified scene graphs and modification queries based on these scene graphs, and leveraging human annotators to increase and analyze data quality. The first two datasets include MSCOCO and GCC while the third dataset is collected using a crowdsourcing application (e.g., Mechanical Turk).

The first two datasets add annotations on top of the captions for MSCOCO and GCC. In some examples, the parser above is used to create 200 k scene graphs from MSCOCO and 420 k scene graphs from GCC data. Comparing the two datasets, the graphs from MSCOCO are relatively simple, while the GCC graphs are more complicated. According to search log, image search queries are short, therefore the MSCOCO graphs represent a closer match to actual search queries, while the GCC graphs present a greater challenge to the models. Based on experiments conducted, the model achieves up to 8.5% increase in performance over the baselines on both the synthetic and user-generated data in terms of F1 score. In statistical analysis of binary classification, the F1 score (also F-score or F-measure) is a measure of a test's accuracy. It is calculated from the precision and recall of the test, where the precision is the number of correctly identified positive results divided by the number of all positive results, including those not identified correctly, and the recall is the number of correctly identified positive results divided by the number of all samples that should have been identified as positive.

Apart from using templates, one embodiment of the present disclosure uses crowd-sourcing applications to obtain more diverse and natural modification queries (e.g., Mechanical Turk). The crowd-sourcing process shows the workers an example which includes a source graph, a target graph and three acceptable modification queries. Then, the workers are asked to fill in their own description for the unannotated instances. The template-based version of the datasets is referred to as "synthetic" while the user-generated contents are referred to as "user-generated".

From preliminary trials, there are some challenges during the data collection process. Firstly, understanding the graphs depends on knowledge related to NLP, thus not all Mechanical Turk workers can provide good modification queries. Secondly, due to deletion and parser errors, some graphs may have disconnected components in the data. Thirdly, there are many overly complicated graphs which are not representative of search queries, as most of the search queries are relatively short (i.e., limited to one or two objects). To mitigate impact of the challenges, one embodiment of the present disclosure manually filters the data by removing graphs with disconnected components, low-quality instances, or excessively long descriptions (i.e., more than 5 nodes). As an example, the final dataset contains 32 k examples.

To test the quality of the crowd-sourced dataset, a user study with 15 testers is performed. The 15 testers are not aware of the nature of the work and the way dataset is collected. The testers are provided with a random collection of instances, each of which is a triplet of source graph, modification query, and target graph. The tester provides a score indicating the quality of each instance based on criteria including how well the modification query is reflected in the target graph, and how natural the query and the graphs are.

The score distribution from 200 randomly chosen instances is recorded. Most three's or four's (i.e., quality scores) are due to the modification query or graphs to be unnatural. Testers tend to give one (i.e., quality scores) for semantically wrong instances. That is, the modification query does not match the changes. Overall, the testers score the data with an average score of 3.76.

Based on the search log, more than 95% of the queries are limited to one or two nodes, thus a scenario in which more than one edit operation applied is not likely to occur. Consequently, the instances in Modified MSCOCO and GCC are constructed with one edit operation. However, in some cases, there may be a very long search description, which leads to the possibility of longer edit operation sequences. According to an embodiment of the present disclosure, the multi-operation version of a dataset is created (i.e., MGM task from GCC data).

The graph size distributions of source graphs and target graphs are almost identical among the sets. With the increase in length of text description, the source graphs become more complicated accordingly. The percentage of the length of queries from search log is analyzed. In most cases, the length of search queries is likely to be less than five tokens. Thus, in practice, it is not likely to encounter large graphs (i.e., more than three nodes) and long modification queries. The distributions of the number of nodes and edges on synthetic and user-generated data are recorded.

Getting annotation from users is expensive, especially for a complex task such as the graph modification task of the present disclosure. Thus, one embodiment explores the possibility of augmenting the user-generated data with synthetic data in order to train the model. However, data augmentation using synthetic data may lead to a different distribution. This is illustrated when testing the model trained using the synthetic data on the user-generated data. For example, the graph generation accuracy drops to around 20%, and adding more synthetic data might not help. To efficiently mix the data distributions, one embodiment of the present disclosure up-samples the user-generated data and mixes it with synthetic data with a ratio of 1:1 in each mini-batch.

Data augmentation using up-sampling is compared with transfer learning (another method to learn from both synthetic and user-generated data). According to an embodiment, the model is pretrained using the synthetic data, and then the model is fine-tuned on the user-generated data.

Graph accuracy (%) results over different data settings are recorded. 30 k means adding 30 k synthetic instances. It shows that data augmentation with up-sampling is an effective method to leverage both sources of data, compared to transfer learning. In addition, as the size of the synthetic data increases, the described scheme further increases the performance to a certain point where it plateaus. For example, the performance reaches plateau after injecting 90 k instances (the data ratio of 3:1). Both up-sampling and pretraining lead to better models compared to using just synthetic data or user-generated data. The graph accuracy for the model trained exclusively on user-generated data is 60.90% (the best result).

In some cases, templates are used for the synthetic data. For example, simplified templates are used for synthetic data, where each operation has ten templates.

Five baselines are considered for comparison. In "Copy Source" baseline, the system copies the source graph to the target graph. It is based on the observation that the user exclusively modifies a small portion of the source graph. In the "Text2Text" baseline, the baseline model flattens the graph and reconstructs the natural sentence in a similar fashion as the modification query. In the "Modified GraphRNN" baseline, the baseline model uses breadth-first-search (BFS) technique based node ordering to flatten the graph (i.e., the topological ties are broken by the order of the nodes appearing in the original query), and use RNNs as the encoders and a decoder. In another two baselines, "Graph Transformer" and "Deep Convolutional Graph Networks" (DCGCN), the baseline models use the Graph Transformers and Deep Convolutional Graph Networks to encode the source graph.

The model from the present disclosure is configured in various ways and results of different configurations of the model are recorded. According to an embodiment of the present disclosure, the fully connected transformer uses dense connections for the graph encoder. In contrast, the sparse transformer uses the connectivity structure of the source graph in self attention. The information from the graph and query encoders can be combined by concatenation, late fused by gating, or early fused by cross attention. The adjacency matrix style for edge decoding can be replaced with flat-edge generation.

One embodiment of the present disclosure uses two automatic metrics for the evaluation. Firstly, the precision/recall/F1-score of the generated nodes and edges are calculated. Secondly, evaluation metrics use the strict-match accuracy, which is defined as the generated graph being identical to the target graph for a correct prediction.

One embodiment of the present disclosure partitions the synthetic MSCOCO data into 196K/2K/2K for training/dev/test, and GCC data into 400K/7K/7K for training/dev/test. In some cases, the crowd-sourced user-generated data are randomly divided into 30K/1K/1K for training/dev/test.

Results of the model and baselines on the synthetic and user-generated datasets are recorded. Based on the experimental results, various configurations of the model are superior to the baselines by a large margin. For example, DCGCN and graph transformer are strong baselines, delivering SOTA performance across tasks such as AMR-to-text generation and syntax-based neural machine translation. The larger number of edge types in the task impairs their capability. Moreover, the hypothesis about the preference of flat-edge generation over adjacency matrix-style edge generation is herein confirmed. Furthermore, the two-way communication between the graph and query encoders through the gating mechanism consistently outperforms a simple concatenation in terms of both edge-level and node-level generation. Eventually the cross-attention (the early fusion technique), leads to substantial increase in all metrics. In some cases, generating the graphs for the crowd-sourced data is much harder than the synthetic data, which is due to diversity in semantics and expressions introduced by the annotators. As a result, all of the models suffer from performance degradation.

The performance trends of different configurations of the model are almost identical on the user-generated and synthetic data. With increasingly complex graphs, the models decrease in performance when inferring the relations among nodes for GCC data, which leads to a drop in terms of the edge F1 score and graph accuracy.

To evaluate the multiple operations scenario, two datasets are created where the average number of the operations is 1.44 and 2.01, respectively. For each dataset, the baselines and the methods are trained on the full training set. The test set is grouped into four bins according to the number of operations. All models decrease in performance with the increase of the number of operations. The model provided by embodiments of the present disclosure performs significantly better than the baselines.

According an embodiment of the present disclosure, the best performance comes from a model which includes cross-attention, flat-edge decoder, and sparse transformer. In most cases, such a configuration outperforms the baselines. The cross-attention is used for relation modifications and dealing with longer descriptions because the early feature fusion reduces noise in graph generation, and retains fine-grained details better than the baseline model.

Embodiments of the present disclosure relate to conditional graph modification, in which models are used to modify a source graph based on a modification command. One configuration of the models, which is based on a graph-conditioned sparse transformer and cross-attention information fusion, outperforms baselines adapted from machine translations and graph generations.

Accordingly, the present disclosure at least includes the following embodiments.

A method for natural language processing is described. Embodiments of the method are configured to receive a structured representation of a search query, wherein the structured representation comprises a plurality of nodes and at least one edge connecting two of the nodes, receive a modification expression for the search query, wherein the modification expression comprises a natural language expression, generate a modified structured representation based on the structured representation and the modification expression using a neural network configured to combine structured representation features and natural language expression features, and perform a search based on the modified structured representation.

An apparatus for natural language processing is described. The apparatus includes a processor, memory in electronic communication with the processor, and instructions stored in the memory. The instructions are operable to cause the processor to receive a structured representation of a search query, wherein the structured representation comprises a plurality of nodes and at least one edge connecting two of the nodes, receive a modification expression for the search query, wherein the modification expression comprises a natural language expression, generate a modified structured representation based on the structured representation and the modification expression using a neural network configured to combine structured representation features and natural language expression features, and perform a search based on the modified structured representation.

A non-transitory computer readable medium storing code for natural language processing is described. In some examples, the code comprises instructions executable by a processor to: receive a structured representation of a search query, wherein the structured representation comprises a plurality of nodes and at least one edge connecting two of the nodes, receive a modification expression for the search query, wherein the modification expression comprises a natural language expression, generate a modified structured representation based on the structured representation and the modification expression using a neural network configured to combine structured representation features and natural language expression features, and perform a search based on the modified structured representation.

Some examples of the method, apparatus, and non-transitory computer readable medium described above further include receiving the search query as an initial natural language expression. Some examples further include generating the structured representation using a graph generator. Some examples of the method, apparatus, and non-transitory computer readable medium described above further include generating the structured representation features based on the structured representation using a graph encoder.

Some examples of the method, apparatus, and non-transitory computer readable medium described above further include generating the natural language expression features based on the modification expression using a text encoder. Some examples of the method, apparatus, and non-transitory computer readable medium described above further include combining the structured representation features and the natural language expression features using a feature fusion network to produce a set of combined features.

Some examples of the method, apparatus, and non-transitory computer readable medium described above further include generating a set of nodes based on the combined features using a node decoder. Some examples of the method, apparatus, and non-transitory computer readable medium described above further include generating a set of edges based on the combined features and the set of nodes using an edge decoder, wherein the modified structured representation comprises the set of nodes and the set of edges.

Some examples of the method, apparatus, and non-transitory computer readable medium described above further include retrieving a plurality of images corresponding to the modified structured representation based on the search.

An apparatus for natural language processing is described. Embodiments of the apparatus include a graph encoder configured to generate structured representation features based on a structured representation, a text encoder configured to generate natural language expression features based on a modification expression, a feature fusion network configured to produce combined features based on the structured representation features and the natural language expression features, a node decoder configured to generate a set of nodes based on the combined features, and an edge decoder configured to generate a set of edges based on the combined features and the set of nodes.

A method of providing an apparatus for natural language processing is described. The method includes a graph encoder configured to generate structured representation features based on a structured representation, a text encoder configured to generate natural language expression features based on a modification expression, a feature fusion network configured to produce combined features based on the structured representation features and the natural language expression features, a node decoder configured to generate a set of nodes based on the combined features, and an edge decoder configured to generate a set of edges based on the combined features and the set of nodes.

Some examples of the apparatus and method described above further include a graph generator configured to generate the structured representation based on a natural language expression. Some examples of the apparatus and method described above further include a search component configured to perform a search based on a modified structured representation comprising the set of nodes and the set of edges.

In some examples, the graph encoder comprises a sparsely connected transformer network. The text encoder comprises a transformer network. The feature fusion network comprises a stage gating mechanism. The feature fusion network comprises a cross-attention network. The node decoder comprises a recurrent neural network (RNN). In some examples, the edge decoder comprises an adjacency matrix decoder. The edge decoder comprises a flat edge-level decoder.

A method for natural language processing is described. Embodiments of the method are configured to identify training data including a plurality of annotated training examples, wherein each of the annotated training examples comprises a source structured representation, a target structured representation, and at least one modification expression, generate structured representation features for the source structured representation using a graph encoder, generate natural language expression features for the at least one modification expression using a text encoder, combine the structured representation features and the natural language expression features using a feature fusion network to produce combined features, generate a set of nodes based on the combined features using a node decoder, generate a set of edges based on the combined features and the set of nodes using an edge decoder, compare the set of nodes and the set of edges to the target structured representation, and update the neural network based on the comparison.

An apparatus for natural language processing is described. The apparatus includes a processor, memory in electronic communication with the processor, and instructions stored in the memory. The instructions are operable to cause the processor to identify training data including a plurality of annotated training examples, wherein each of the annotated training examples comprises a source structured representation, a target structured representation, and at least one modification expression, generate structured representation features for the source structured representation using a graph encoder, generate natural language expression features for the at least one modification expression using a text encoder, combine the structured representation features and the natural language expression features using a feature fusion network to produce combined features, generate a set of nodes based on the combined features using a node decoder, generate a set of edges based on the combined features and the set of nodes using an edge decoder, compare the set of nodes and the set of edges to the target structured representation, and update the neural network based on the comparison.

A non-transitory computer readable medium storing code for natural language processing is described. In some examples, the code comprises instructions executable by a processor to: identify training data including a plurality of annotated training examples, wherein each of the annotated training examples comprises a source structured representation, a target structured representation, and at least one modification expression, generate structured representation features for the source structured representation using a graph encoder, generate natural language expression features for the at least one modification expression using a text encoder, combine the structured representation features and the natural language expression features using a feature fusion network to produce combined features, generate a set of nodes based on the combined features using a node decoder, generate a set of edges based on the combined features and the set of nodes using an edge decoder, compare the set of nodes and the set of edges to the target structured representation, and update the neural network based on the comparison.

In some examples, the neural network is updated using an end-to-end training technique wherein parameters of the graph encoder, the text encoder, the feature fusion network, the node decoder, and the edge decoder are updated during each training iteration.

The description and drawings described herein represent example configurations and do not represent all the implementations within the scope of the claims. For example, the operations and steps may be rearranged, combined, or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for natural language processing, comprising:
   receiving a query comprising an initial natural language expression including a plurality of elements;
   generating a structured representation of the query, wherein the structured representation comprises a plurality of nodes corresponding to the plurality of elements and at least one edge connecting two of the plurality of nodes;
   generating, using a graph encoder, a plurality of node embeddings corresponding to the plurality of nodes based at least in part on the at least one edge;
   receiving a modification command for the query, wherein the modification command comprises a natural language expression describing a change to an element of the plurality of elements in the query, and wherein the modification command specifies a symbolic change to the structured representation of the query;
   generating, using a text encoder, a plurality of text embeddings representing the modification command;
   generating, using a feature fusion network, a combined embedding representing the query and the modification command based on the plurality of node embeddings and the plurality of text embeddings; and
   generating a modified structured representation by decoding the combined embedding, wherein the modified structured representation includes an updated plurality of nodes and an updated plurality of edges representing the query with the change indicated by the modification command.

2. The method of claim 1, wherein:
   the plurality of node embeddings and the plurality of text embeddings are located in a common embedding space.

3. The method of claim 1, wherein:
   the structured representation comprises a scene graph and the modified structured representation comprises a modified scene graph.

4. The method of claim 1, further comprising:
   performing a search based on the modified structured representation.

5. The method of claim 1, wherein generating the modified structured representation further comprises:
   applying a transformer network to a plurality of combined embeddings including the plurality of node embeddings and the plurality of text embeddings.

6. The method of claim 1, wherein generating the modified structured representation further comprises:
   modifying the plurality of node embeddings based on the modification command to obtain a plurality of updated node embeddings; and
   modifying the plurality of text embeddings based on the structured representation to obtain a plurality of updated text embeddings, wherein a plurality of combined embeddings include the plurality of updated node embeddings and the plurality of updated text embeddings.

7. The method of claim 1, further comprising:
   performing a search based on the modified structured representation; and
   retrieving a plurality of images corresponding to the modified structured representation based on the search.

8. An apparatus for natural language processing, comprising:
   a graph generator configured to generate a structured representation of a query comprising an initial natural language expression including a plurality of elements, wherein the structured representation comprises a plurality of nodes corresponding to the plurality of elements and at least one edge connecting two of the plurality of nodes;
   a graph encoder configured to generate a plurality of node embeddings corresponding to the plurality of nodes based at least in part on the at least one edge;
   a text encoder configured to generate a plurality of text embeddings representing a modification command for the query, wherein the modification command comprises a natural language expression describing a change to an element of the plurality of elements in the query, and wherein the modification command specifies a symbolic change to the structured representation of the query;

a feature fusion network configured to generate a combined embedding representing the query and the modification command based on the plurality of node embeddings and the plurality of text embeddings, and generate a modified structured representation by decoding the combined embedding;

a node decoder configured to generate an updated plurality of nodes based on a plurality of combined embeddings that combines the plurality of node embeddings and the plurality of text embeddings; and an edge decoder configured to generate an updated plurality of edges based on the plurality of combined embeddings and the updated plurality of nodes.

9. The apparatus of claim 8, further comprising:

a search component configured to perform a search based on the modified structured representation comprising the updated plurality of nodes and the updated plurality of edges.

10. The apparatus of claim 8, wherein:

the graph encoder comprises a sparsely connected transformer network.

11. The apparatus of claim 8, wherein:

the text encoder comprises a transformer network.

12. The apparatus of claim 8, wherein:

the feature fusion network comprises a stage gating mechanism.

13. The apparatus of claim 8, wherein:

the feature fusion network comprises a cross-attention network.

14. The apparatus of claim 8, wherein:

the node decoder comprises a recurrent neural network (RNN).

15. The apparatus of claim 8, wherein:

the edge decoder comprises an adjacency matrix decoder.

16. The apparatus of claim 8, wherein:

the edge decoder comprises a flat edge-level decoder.

17. A method for training a neural network, the method comprising:

identifying training data including a plurality of annotated training examples, wherein each of the annotated training examples comprises a source structured representation of a query, a target structured representation, and at least one modification command for the query, wherein the query comprises an initial natural language expression including a plurality of elements, wherein the source structured representation comprises a plurality of nodes corresponding to the plurality of elements and at least one edge connecting two of the plurality of nodes, wherein the at least one modification command comprises a natural language expression describing a change to an element of the plurality of elements in the query, and wherein the at least one modification command specifies a symbolic change to the source structured representation of the query;

generating a plurality of node embeddings corresponding to the plurality of nodes based at least in part on the at least one edge for the source structured representation using a graph encoder;

generating a plurality of text embeddings representing the at least one modification command using a text encoder;

generating, using a feature fusion network, a combined embedding representing the query and the at least one modification command based on the plurality of node embeddings and the plurality of text embeddings;

generating a modified structured representation by decoding the combined embedding, wherein the modified structured representation includes an updated plurality of nodes and an updated plurality of edges representing the query with the change indicated by the at least one modification command;

comparing the updated plurality of nodes and the updated plurality of edges to the target structured representation; and updating the neural network based on the comparison.

18. The method of claim 17, wherein:

the neural network is updated using an end-to-end training technique wherein parameters of the graph encoder, the text encoder, the feature fusion network, a node decoder, and an edge decoder are updated during each training iteration.

* * * * *